(12) United States Patent
Nakao

(10) Patent No.: US 7,629,021 B2
(45) Date of Patent: Dec. 8, 2009

(54) METHOD FOR PRODUCING A STAMPER

(75) Inventor: Hiroshi Nakao, Higashine (JP)

(73) Assignee: Yamagata Fujitsu Limited, Higashine-shi (JP)

( * ) Notice: Subject to any disclaimer, the term of this patent is extended or adjusted under 35 U.S.C. 154(b) by 619 days.

(21) Appl. No.: 11/258,355

(22) Filed: Oct. 26, 2005

(65) Prior Publication Data

US 2006/0286345 A1    Dec. 21, 2006

(30) Foreign Application Priority Data

Jun. 16, 2005    (JP)    ............... 2005-177041

(51) Int. Cl.
*B05D 5/12*    (2006.01)
(52) U.S. Cl. ............... 427/127; 427/130; 427/132; 427/443.2; 101/4; 264/320
(58) Field of Classification Search ............ 427/127, 427/132, 443.2; 101/4; 264/93, 320
See application file for complete search history.

(56) References Cited

U.S. PATENT DOCUMENTS

| 6,723,198 | B1 * | 4/2004 | Kurataka et al. ............ 156/232 |
| 2005/0045583 | A1 * | 3/2005 | Fujita et al. .................... 216/44 |

FOREIGN PATENT DOCUMENTS

| JP | 52-134706 | 11/1977 |
| JP | 61-42721 | 3/1986 |
| JP | 64-13216 | 1/1989 |
| JP | 64-19520 | 1/1989 |
| JP | 1-211213 | 8/1989 |
| JP | 2-143914 | 6/1990 |
| JP | 2-223008 | 9/1990 |
| JP | 2-308412 | 12/1990 |
| JP | 2-308413 | 12/1990 |
| JP | 3-8108 | 1/1991 |

(Continued)

OTHER PUBLICATIONS

English machine translation of JP 2002-175621; JPO; 2008; 10 pages.*

(Continued)

*Primary Examiner*—Michael Kornakov
*Assistant Examiner*—Xiao Zhao
(74) *Attorney, Agent, or Firm*—Westerman, Hattori, Daniels & Adrian, LLP

(57) ABSTRACT

The object of the present is to provide high-quality magnetic recording media capable of easy tracking, and allowing high-density recording, high-speed recording, and higher capacity without increasing the write-current at magnetic heads. The nanohole structure comprises a metal or metal-compound base material and plural arrays of nanoholes, wherein the plural arrays of nanoholes are respectively arranged into regular alignments, the regular alignments are different between adjacent arrays, and the regular alignments are alternately disposed within the metal or metal-compound base material. The magnetic recording medium according to the present invention comprises a substrate, a porous layer into which plural nanoholes are formed, and a magnetic material within the plural nanoholes, wherein the plural nanoholes are formed in a direction approximately vertical to the plane of the substrate, the porous layer is a nanohole structure according to the present invention.

5 Claims, 26 Drawing Sheets

FOREIGN PATENT DOCUMENTS

| | | |
|---|---|---|
| JP | 6-180834 | 6/1994 |
| JP | 10-320772 | 12/1998 |
| JP | 11-66654 | 3/1999 |
| JP | 2001-209925 | 8/2001 |
| JP | 2001-283419 | 10/2001 |
| JP | 2002-175621 | 6/2002 |
| JP | 2002-298448 | 10/2002 |
| JP | 2003-25298 | 1/2003 |
| JP | 2003-109333 | 4/2003 |
| JP | 2003-129288 | 5/2003 |
| JP | 2003-157503 | 5/2003 |
| JP | 2003-226984 | 8/2003 |

OTHER PUBLICATIONS

Stephen Y. Chou, "Patterned Magnetic Nanostructures and Quantized Magnetic Disks", IEEE vol. 85 No. 4, pp. 652-671 (1997).

* cited by examiner

Prior Art

Prior Art

Prior Art

400

Dispersion Of Fine Particles

Data Region

Servo Region

Data Region on track

Right Displacement

Left Displacement

700

METHOD FOR PRODUCING A STAMPER

CROSS-REFERENCE TO RELATED APPLICATIONS

This application is based upon and claims the benefit of priority from the prior Japanese Patent Application No. 2005-177041, filed on Jun. 16, 2005, the entire contents of which are incorporated herein by reference.

BACKGROUND OF THE INVENTION

1. Field of the Invention

The present invention relates to nanohole structures adapted to magnetic recording media, and method for economically and efficiently producing the nanohole structures; stampers properly utilized to produce the nanohole structures and capable of producing the nanohole structures efficiently, and methods for producing the stampers; magnetic recording media adapted to hard disks utilized in various products such as external memory devices of computers and recording devices of public videos, capable of easy tracking, and allowing high-density recording, high-speed recording, and higher capacity, and methods economically and efficiently for producing the magnetic recording media; and magnetic recording devices and magnetic recording methods that utilize the magnetic recording media in perpendicular recording manner.

2. Description of the Related Art

With technological innovations in information technology industries, demands have been made to provide magnetic recording media which have larger capacity, enable high-speed recording, and are available at lower cost. In order to attain the larger capacity, high-speed recording, and lower cost, the recording density is essentially required to increase in the magnetic recording media. Previously, recording densities of magnetic recording media have been increased by horizontally recording information on continuous magnetic films in the media. However, the related technology may almost have saturated; namely, when crystal grains of magnetic particles constituting the continuous magnetic film have large sizes, complex magnetic domains are formed to thereby increase noise. In contrast, when the magnetic particles have smaller sizes to avoid the noise, the magnetization tends to decrease with time due to thermalfluctuation, thus inviting errors. In addition, demagnetizing field for recording relatively increases with increasing recording densities of magnetic recording media. Thus, the magnetic recording media must have an increased coercive force and do not have sufficient overwrite properties due to insufficient writing ability of recording heads.

Recently, considerable efforts have been made to develop an advanced recording system in place of the horizontal recording systems. One of them is a recording system using a patterned magnetic recording medium, in which a magnetic film in the medium is not a continuous film but is in the pattern of, for example, dot, bar or pillar on the order of nanometers and thereby constitutes not a complex magnetic domain structure but a single domain structure (e.g., S. Y. Chou Proc. IEEE 85 (4), 652 (1997)). Another is a perpendicular recording system, in which a recording demagnetization field is smaller and information can be recorded at a higher density than in the horizontal recording system, the recording layer can have a somewhat large thickness and the recording magnetization is resistant to thermalfluctuations (e.g., Japanese Patent Application Laid-Open (JP-A) No. 06-180834). On the perpendicular recording system, JP-A No. 52-134706 proposes a combination use of a soft-magnetic film and a perpendicularly magnetized film. However, this proposal is insufficient in writing ability with a single pole head. To avoid this problem, JP-A No. 2001-283419 proposes a magnetic recording medium further comprising a soft-magnetic underlayer. Such magnetic recording on a magnetic recording medium according to the perpendicular recording system is illustrated in FIG. 1. A read-write head of single pole head 100 of perpendicular-magnetic-recording system has main pole 102 facing recording layer 30 of the magnetic recording medium. The magnetic recording medium comprises a substrate, soft-magnetic layer 10, intermediate layer 20 (non-magnetic layer) and a recording layer 30 (perpendicularly magnetized film) arranged in this order. The main pole 102 of the read-write head 100 (single pole head) supplies a recording magnetic field toward the recording layer 30 (perpendicularly magnetized film) at a high magnetic flux density. The recording magnetic field flows from the recording layer 30 (perpendicularly magnetized film) via the soft-magnetic layer 10 to latter half portion 104 of the read-write head 100 to form a magnetic circuit. The latter half portion 104 has a portion facing the recording layer 30 (perpendicularly magnetized film) with a large size, and thereby its magnetization does not affect the recording layer 30 (perpendicularly magnetized film). The soft-magnetic layer 10 in the magnetic recording medium also has the same function as the read-write head 100 (single pole head).

However, the soft-magnetic layer 10 focuses not only the recording magnetic field supplied from the read-write head 100 (single pole head) but also a floating magnetic field leaked from surroundings to the recording layer 30 (perpendicularly magnetized film) to thereby magnetize the same, thus inviting increased noise in recording. The patterned magnetic film requires complicated patterning procedures and thus is expensive. In the magnetic recording medium having the soft-magnetic underlayer, the soft-magnetic underlayer must be arranged at a close distance from the single pole head in magnetic recording. Otherwise, a magnetic flux extending from the read-write head 100 (single pole head) to the soft-magnetic underlayer 40 diverge with an increasing distance between the two components, and information is recorded in a broadened magnetic field with larger bits in the lower part of the recording layer 30 (perpendicularly magnetized film) arranged on the soft-magnetic underlayer 40 (see FIGS. 2A and 2B). In this case, the read-write head 100 (single pole head) must supply an increasing write current. In addition, if a small bit is recorded after recording a large bit, a large portion of the large bit remains unerased, thus deteriorating the overwrite properties.

As such, advanced magnetic recording media are proposed that combines perpendicular recording in addition to the recording on the base of patterned media and comprises a magnetic metal inserted within pores of anodizing alumina pores (e.g. JP-A No. 2002-175621).

As shown in FIG. 3, the magnetic recording medium comprises anodized alumina pores 130 (alumina layer), underlayer electrode 120 on substrate 110 in this order. Many alumina pores are arranged in a pattern at the anodized alumina pores 130 (alumina layer), and a ferromagnetic metal is inserted within the alumina pores to form ferromagnetic layer 140.

In the magnetic recording medium comprising the anodized alumina pores inserted with a magnetic material, the anodized alumina pores extend with a high aspect ratio in a direction perpendicular to an exposed surface. The medium is susceptible to magnetization in the perpendicular direction, is dimensionally anisotropic with respect to the magnetic material, and is resistant to thermalfluctuation. The anodized alumina pores generally grow in a self-organizing manner to form honeycomb lattices of hexagonal closest packing and can be produced at lower cost than in the formation of such pores one by one by lithography processes. The patterns for acting as origins of alumina pores may beneficially make possible to form magnetic arrays having optional array patterns.

The methods for forming a pattern of alumina pore origins are exemplified by pattern forming methods by use of photolithography processes and by use of stampers to press a pattern, which are demanded to form patterns economically and efficiently. Methods on the concept of arranging fine particles have been expected for application to methods for forming surface configuration of stampers. The methods on the concept of arranging fine particles may lead to a method to form a hexagonal close-packed pattern by use of self-organization through arranging nano-fine particles with a desirable pitch and a size on a flat substrate. The methods on the concept of arranging fine particles may be based on pulling out processes or centrifugal processes. The centrifugal processes are related to the method in which a substrate is immersed into a dispersion of fine particles and the substrate and the dispersion are centrifuged to press the fine particle onto the substrate by action of centrifugal force, thereby closest packing of monolayer fine particles is obtainable (see JP-A No. 2003-226984), which are advantageous in that the process is simple and easy and the processing period is relatively short. However, the resultant films are mainly of a domain structure due to no film-forming anisotropy, and single-crystal films are hardly obtainable.

On the other hand, magnetic heads are utilized for recording-regenerating information in magnetic recording devices. However, the sites of magnetic heads are typically difficult to be adjusted so as to make the magnetic head trace the track-center correctly (tracking); namely, not only patterned media with anodized alumina pores but also the other patterned media currently suffer from non-appropriate tracking methods, thus easy and efficient arrangements of magnetic materials have been demanded for easily carrying out tracking.

The objects of the present invention are to provide nanohole structures applied to various fields such as magnetic recording media, DNA chips, and catalyst carriers, and methods for economically and efficiently producing the nanohole structures; stampers properly utilized to produce the nanohole structures and capable of producing the nanohole structures efficiently, and methods for producing the stampers; magnetic recording media adapted to hard disks utilized in various products such as external memory devices of computers and recording devices of public videos, capable of easy tracking, and allowing high-density recording, high-speed recording, and higher capacity without increasing the write-current at magnetic heads, and methods economically and efficiently for producing the magnetic recording media; and magnetic recording devices and a magnetic recording methods that utilize the magnetic recording media in perpendicular recording manner.

SUMMARY OF THE INVENTION

The nanohole structure comprises a metal or metal-compound base material and plural arrays of nanoholes, wherein the plural arrays of nanoholes are respectively arranged into regular alignments, the regular alignments are different between adjacent arrays, and the regular alignments are alternately disposed within the metal or metal-compound base material.

When the nanoholes are inserted with magnetic materials, the nanohole structures can be utilized as magnetic recording media of hard disk devices; when the nanoholes are introduced with DNA, the nanohole structures can be utilized as DNA chips; when the nanoholes are introduced with antibodies, the nanohole structures can be utilized as protein-detecting devices or diagnostic devices; and when the nanoholes are inserted with catalyst metals for forming nanotubes, the nanohole structures can be utilized as carriers for producing carbon nanotubes.

In the nanohole structures according to the present invention, the plural arrays of nanoholes are respectively arranged into regular alignments, the regular alignments are different between adjacent arrays and are alternately disposed within the metal or metal-compound base material; therefore, magnetic recording media, formed from the nanohole structures, can easily undergo tracking of magnetic heads due to the alternative difference between adjacent alignments.

The method for producing a nanohole structure comprises forming a convexoconcave line on a support, arranging fine particles on the support to form a pattern, transferring the pattern to a stamper material to form a stamper, forming origins of nanoholes on a metal or metal-compound base material by use of the stamper, and forming nanoholes into the metal or metal-compound base material to form a nanohole structure, wherein the pattern is formed from aligned fine particles, the fine particles are aligned into monolayer along the convexoconcave line, thereby the nanohole structure according to the present invention is produced.

In accordance with the method according to the present invention, the stamper, having approximately the same pattern with the pattern of the aligned fine particles i.e. the pattern of spherical convex portions, is produced by way of forming a convexoconcave line on a support, arranging fine particles on the support to form a pattern, and transferring the pattern to a stamper material. The stamper performs to form origins of nanoholes on a metal or metal-compound base material, wherein the origins are concave portions that are formed by transferring the surface shape of the stamper and performs as origins for forming nanoholes, and then nanoholes are formed into the metal or metal-compound base material with action of the origins. Consequently, the nanohole structure according to the present invention can be produced easily and efficiently.

The magnetic recording medium according to the present invention comprises a substrate, a porous layer into which plural nanoholes are formed, and a magnetic material within the plural nanoholes, wherein the plural nanoholes are formed in a direction approximately vertical to the plane of the substrate, and the porous layer is a nanohole structure according to the present invention described above.

In the magnetic recording medium according to the present invention, the plural arrays of nanoholes into which the magnetic material is inserted are respectively arranged into regular alignments, the regular alignments are different between adjacent arrays, and the regular alignments are alternately disposed within the metal or metal-compound base material, thus tracking can be easily carried out and the site of the magnetic head can be adjusted such that magnetic heads trace correctly the track center, therefore the magnetic recording medium can be provided with extremely high quality. The magnetic recording medium can be appropriately applied to various products such as external memory devices of computers and recording devices of public videos.

In the magnetic recording medium, it is preferred that the nanoholes each contains a soft magnetic layer and a ferromagnetic layer in this order from the substrate, and the ferromagnetic layer has a thickness equal to or less than that of the soft magnetic layer. In the magnetic recording medium, the ferromagnetic layer is arranged on or above the soft magnetic layer inside the nanoholes in the porous layer and has a thickness less than that of the porous layer. When magnetic recording is carried out on the magnetic recording medium using a single pole head, the distance between the single pole head and the soft magnetic layer is less than the thickness of the porous layer and is substantially equal to the thickness of the ferromagnetic layer. Thus, the convergence of a magnetic flux from the single pole head and the optimum properties for magnetic recording and reproduction at a recording density can be controlled only by controlling the thickness of the ferromagnetic layer, regardless of the thickness of the porous layer. As shown in FIG. 2B and FIG. 4, the magnetic flux from the single pole head 100 (read-write head) converges to the ferromagnetic layer 30 (perpendicularly magnetized film). As a result, the magnetic recording medium exhibits significantly increased write efficiency, requires a decreased write current, and has markedly improved overwrite properties as compared with conventional equivalents.

The method for producing a magnetic recording medium according to the present invention comprises forming a metal layer on a substrate, forming plural nanoholes into the metal layer to produce a nanohole structure, and inserting a magnetic material within the plural nanoholes, thereby the magnetic recording medium according to the present invention is produced. Preferably, the inserting of the magnetic material comprises a step of forming a soft-magnetic layer into the nanoholes and a step of forming a ferromagnetic layer on the soft-magnetic layer.

In accordance with the method, the magnetic recording medium according to the present invention described above can be produced easily and economically. When the inserting of the magnetic material comprises a step of forming a soft-magnetic layer into the nanoholes and a step of forming a ferromagnetic layer on the soft-magnetic layer, the soft-magnetic layer is formed within the nanoholes in the step of forming a soft-magnetic layer, and the ferromagnetic layer is formed on the soft-magnetic layer in the step of forming a ferromagnetic layer.

The magnetic recording device according to the present invention comprises the magnetic recording medium according to the present invention described above and a perpendicular magnetic recording head. In the magnetic recording device, the recording is performed to the magnetic recording medium by the perpendicular magnetic recording head, which affords easy tracking, provides high-density recording and high-speed recording with higher capacity without increasing write current at magnetic heads, and represents excellent overwrite property.

The magnetic recording method according to the present invention comprises recording information on a magnetic recording medium by use of a perpendicular magnetic recording head. In the magnetic recording method, the recording is performed to the magnetic recording medium by the perpendicular magnetic recording head, which affords easy tracking, provides high-density recording and high-speed recording with higher capacity without increasing write current at magnetic heads, and represents excellent overwrite property. When the magnetic recording medium is one including the nanoholes each containing a soft magnetic layer and a ferromagnetic layer in this order from the substrate, and the ferromagnetic layer having a thickness equal to or less than that of the soft magnetic layer, and magnetic recording is carried out on the magnetic recording medium using the perpendicular magnetic recording head such as a single pole head, the distance between the perpendicular magnetic recording head and the soft magnetic layer is less than the thickness of the porous layer and is substantially equal to the thickness of the ferromagnetic layer. Thus, the convergence of a magnetic flux from the perpendicular magnetic recording head and the optimum properties for magnetic recording and reproduction at a recording density in practice can be controlled only by controlling the thickness of the ferromagnetic layer, regardless of the thickness of the porous layer. As shown in FIGS. 2B and 4, the magnetic flux from the perpendicular magnetic recording head 100 (read-write head) converges to the ferromagnetic layer 30 (perpendicularly magnetized film). As a result, the magnetic recording method exhibits significantly increased write efficiency, requires a decreased write current, and has markedly improved overwrite properties as compared with conventional equivalents.

Figure 1:
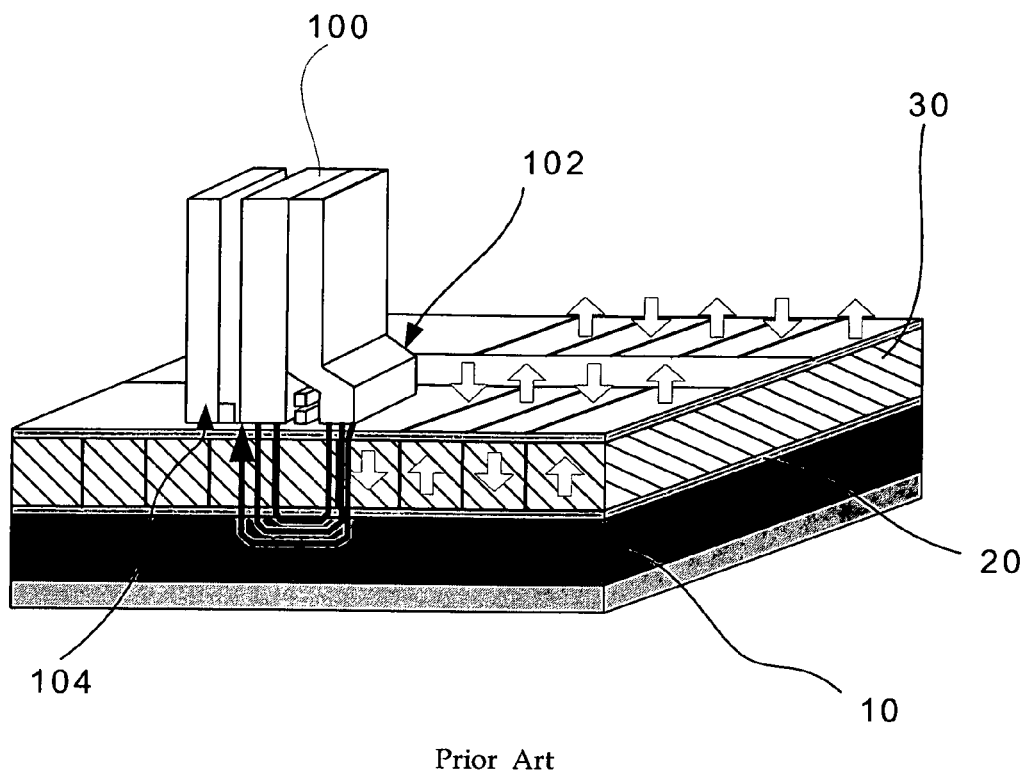
FIG. 1 is an exemplary conception view that schematically shows a magnetic recording in a perpendicular recording system.

DESCRIPTION OF THE PREFERRED EMBODIMENTS (Nanohole Structure)

The nanohole structures according to the present invention are not specifically limited, as long as the plural arrays of nanoholes are respectively arranged into regular alignments, the regular alignments are different between adjacent arrays, and the regular alignments are alternately disposed on a metal or metal-compound base material; thus the material, shape, configuration, size and other parameters may be properly selected according to the application.

The material for the metal or metal-compound base material may be properly selected depending on the application; the material may be selected from elementary metals, metal oxides, metal nitrides, and alloys. Among these, alumina or aluminum oxide, aluminum, glasses, and silicon are preferable in particular.

The shape of the nanohole structure may be properly selected depending on the application; for example, plate or disk shape is preferable. The nanohole structures preferably have a disk shape when utilized in magnetic recording media such as hard disks.

When the nanohole structure has a plate or disk shape, the nanoholes or small pores are arranged so as to extend in a direction substantially perpendicular to an exposed surface or plane of the plate or disk.

The nanoholes may be through holes penetrating the nanohole structure or may be pits or concave portions not penetrating the nanohole structure. The nanoholes are preferably through holes penetrating the nanohole structure when the nanohole structure is utilized for magnetic recording media.

The configuration of the nanohole structure may be properly selected depending on the application; for example, the configuration may be of single layer or multilayer.

The size of the nanohole structure may be properly selected depending on the application; for example, when the nanohole structure is used in magnetic recording media such as hard disks, the nanohole structure preferably has a size corresponding to the size of regular hard disks. When the nanohole structure is used as a DNA chip, the nanohole structure preferably has a size corresponding to regular DNA chips. When the nanohole structure is used as a catalyst carrier such as a carbon nanotube for a field-emission device, the nanohole structure preferably has a size corresponding to the field-emission device.

The regular alignments of nanoholes may be properly selected depending on the application; for example, the regular alignments are preferably arranged in parallel so as to extend in one direction when the nanohole structure is utilized for DNA chips. Preferably, the regular alignments are arranged concentrically or helically when the nanohole structure is utilized for magnetic recording media such as hard disks or video disks. More specifically, the regular alignments are preferably concentrically arranged for the use for hard disks owing to easy access, and are preferably helically arranged for the use for video disks owing to easy continuous regeneration.

Preferably, a regular alignment and another regular alignment are arranged alternately to form the plural arrays of nanoholes. When the nanohole structure is applied to magnetic recording media such as hard disks by way of using a regular alignment as a data region and another regular alignment adjacent to the regular alignment as a guard band region, the tracking can be easily carried out by making use of the difference of the regular alignments since the regular alignments at the data region and guard band region are different each other.

The width of the regular alignments of nanoholes may be properly selected depending on the application; for example, when the nanohole structure is applied to magnetic recording media such as hard disks and a regular alignment is utilized as a data region and another regular alignment adjacent to the regular alignment is utilized as a guard band region, preferably, the ratio of the width of the data region to the width of the guard band region is 2:1 in order to easily perform the tracking. More specifically, the width of the regular alignment utilized as a data region is preferably 15 nm to 200 nm, and the width of another regular alignment utilized as a guard band region is preferably 7 nm to 100 nm, for example.

The pattern of the regular alignments of nanoholes may be properly selected depending on the application as long as adjacent regular alignments are different each other. Preferably, at least one of regular alignments is formed from nanoholes arranged into hexagonal closest packing. The hexagonal closest packing is the most stable pattern within various nanohole patterns; therefore, fluctuations of patterns other than intentional purpose can be minimized.

When the nanohole structure is applied to magnetic recording media such as hard disks, the tracking can be easily performed by detecting the frequency-intensity changes or signal-phase changes due to the difference of alignment patterns between the adjacent regular alignments.

The aperture diameter of the nanoholes may be properly selected depending on the application. When the nanohole structure is utilized in the magnetic recording media such as hard disks, the diameter of apertures is preferably such that the ferromagnetic layer can be of single domain structure. Preferably, the diameter is $2/3$ or less, more preferably $1/3$ to $2/5$ of the nanohole pitch. For example, when the pitch of the nanoholes is 30 nm, the aperture diameter of the nanoholes is preferably 20 nm or less, more preferably 10 nm to 12 nm.

When the diameter of nanohole apertures exceeds $2/3$ of nanohole pitch, e.g. the diameter exceeds 20 nm when the pitch is 30 nm, the magnetic recording media, comprising the nanohole structure, may be of other than single domain structure.

The aspect ratio of the depth to the aperture diameter (depth/aperture diameter) of nanoholes may be properly selected depending on the application. Higher aspect ratios are preferable for higher anisotropy in dimensions and for higher coercive force of the magnetic recording medium. When the nanohole structure is used in the magnetic recording media such as hard disks, the aspect ratio is preferably 2 or more, more preferably 3 to 15. Aspect ratios less than 2 may invite insufficient coercive force of magnetic recording media.

The thickness of the nanohole structure may be properly selected depending on the application. When the nanohole structure is used in the magnetic recording media such as hard disks, the thickness is preferably 500 nm or less, more preferably 300 nm or less and still more preferably 20 to 200 nm.

When the nanohole structure having a thickness above 500 nm is utilized for magnetic recording media such as hard disks, information may not be recorded thereon at higher densities even when a soft-magnetic underlayer is further provided to the magnetic recording media. Thus, the nanohole structure must be polished to reduce its thickness and the production of the magnetic recording media may take a long time, invite higher cost, and lead to deteriorated quality.

The nanohole structure may be prepared by conventional methods without particular limitations. For example, the nanohole structure may be prepared by forming a layer of a metal material by sputtering or vapor deposition and anodizing the metal layer to form the nanoholes; preferably, the nanohole structure is prepared by the method for producing a nanohole structure according to the present invention described later.

Preferably, a pattern for forming the regular alignments of nanoholes is previously formed on the metal or metal-compound base material before an anodization process, thereby nanoholes may be formed advantageously only on the pattern by the anodization process.

The method for producing the pattern may be properly selected depending on the application; for example, the pattern is appropriately produced as follows.

A stamper is imprint-transferred on a metal layer or metal oxide layer such as of aluminum or alumina, and a pattern is formed on the layer, in which the stamper has such a surface texture that round convexes are arranged into a pattern such as hexagonal closest packing to form a regular alignment and the plural regular alignments are disposed alternately (when the nanohole structure is applied to magnetic disks, the regular alignments of convexes are arranged concentrically or spirally), and the pattern on the layer has such a configuration that circles are arranged into a pattern of hexagonal closest packing and the plural regular alignments are disposed alternately. Also, the pattern may be produced by forming a resin layer or photoresist layer on the metal layer or metal oxide layer, then the metal layer or metal oxide layer is subjected to patterning and etching by a conventional photo process or imprint process, thereby a pattern is formed in which concaves are arranged into a pattern such as hexagonal closest packing to form the regular alignment and the plural regular alignments are disposed alternately.

The material of the stamper may be properly selected depending on the application, for example, silicon, silicon oxide, and combination thereof are nominated from the viewpoint of widest experiences in the material for forming fine structure in semiconductor fields, and silicon carbide is nominated from the view point of durability under long usage. Further, Ni stampers for forming optical disks may be available. The stamper may be used plural times. The imprint transfer can be carried out according to conventional procedures depending on the application. The resist materials for the photoresist layer include not only photoresist materials but also electron beam resist materials. The photoresist material for use herein may be properly selected from conventional materials in the field of semiconductors such as those sensitive to near-ultraviolet rays or near-field light.

The pitch of nanoholes may be properly decided based on the voltage at anodizing processes; the pitch (nm) is typically about 2.5 times of the anodizing voltage (V). Accordingly, the voltage at the anodizing process is preferably 3 V to 40 V, more preferably 3 V to 10 V, but not limited to.

When the voltage is 3 V to 40 V, higher density of the magnetic recording media may be attained; and when the voltage is 3 V to 10 V, the pitch of nanoholes may be controlled into 7 nm to 25 nm, resulting advantageously in still higher density of the magnetic recording media.

The anodization may be carried out under properly selected conditions including the type, concentration, and temperature of electrolytes, and the time period for anodization according to the number, size, and aspect ratio of the resultant nanoholes. For example, the electrolyte is preferably a diluted phosphoric acid solution, diluted oxalic acid solution, or diluted sulfuric acid solution. In any case, the aspect ratio of the nanoholes can be controlled by immersing the anodized metal layer in, for example, a phosphoric acid solution to thereby increase the diameter of the nanoholes such as alumina pores.

The nanohole structures according to the present invention are useful in magnetic recording media such as hard disks widely used in external storages for computers and consumer-oriented video recorders, as well as DNA chips and catalyst carriers.

(Stamper and Method for Producing the Same)

The stamper according to the present invention may be produced by the method for producing a stamper according to the present invention. The method for producing a stamper comprises a step for forming a pattern, a step for transferring a pattern, and the other steps depending on requirements.

The stampers according to the present invention will be still more clarified through the discussions in terms of the method for producing a stamper according to the present invention.

—Step for Forming Pattern—

In the step for forming a pattern, convexoconcave lines are formed on a support and fine particles are disposed on the convexoconcave lines into a pattern of monolayer.

The support may be properly selected depending on the application; for example, the support is preferably selected from various polymer plastics, metals, metal oxides, metal hydroxides, glasses, or ceramics. More preferably, the support is of glasses, ITO, or gold. Various polymer plastics, metals, metal oxides, metal hydroxides, glasses, or ceramics having ITO or gold on the surface may also be preferably utilized.

The shape of the support may be properly selected depending on the application; the shape may be sheet, film, etc. other than the usual shape of plate.

The cross-sectional shape of the convexoconcave line perpendicular to the length direction may be properly selected depending on the application; for example, the shape may be rectangle, V-shape, or semicircle. Among these, rectangle is preferable since the fine particles can be easily arranged. When fine particles are arranged into a monolayer through forming the convexoconcave line, the resultant film can be prevented from taking a domain structure.

The width of the convex and concave portions of the convexoconcave line may be properly selected depending on the application. Preferably, the width of either convex or concave portion is expressed by $(2n+1)r$ (r: radius of the fine particles, n: an integer of 1 or more), and the other width is expressed by $n \times r$ (n: an integer of 1 or more). Alternatively, both widths of the convex and concave portions may be expressed by $(2n+1)r$ (n: an integer of 1 or more, which is different between the convex and concave portions).

In such cases, the fine particles can be integrated into the convex and concave portions respectively in different regular alignments.

The height of the convex portions of the convexoconcave line may be properly selected depending on the application. Preferably, the height is shorter than $2r$. In such cases, the fine particles can be arranged into hexagonal closest packing on the convexoconcave line.

Figure 5A:
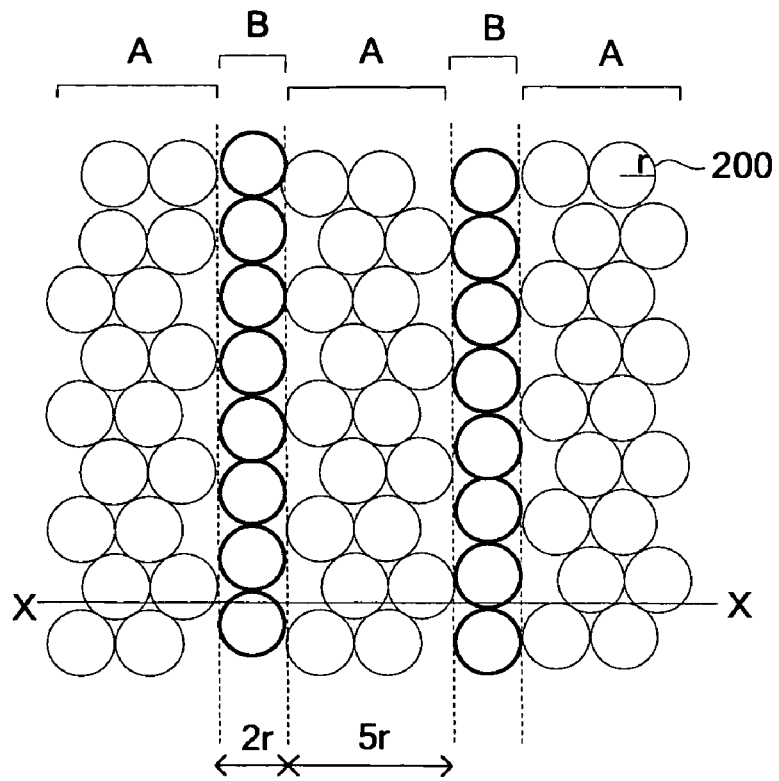
FIG. 5A is a schematic view that exemplarily explains a relation between the widths of convexoconcave lines and alignments of fine particles.
Figure 5B:
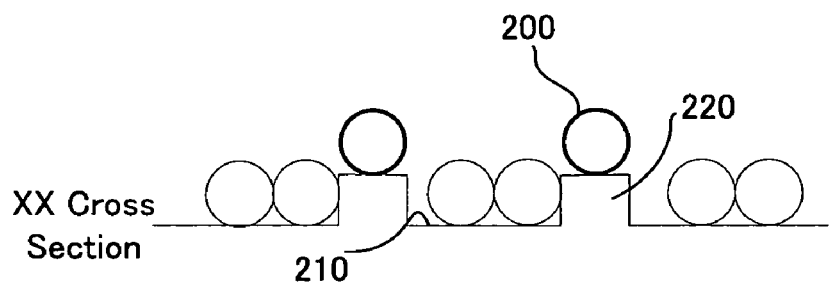
FIG. 5B is a schematic cross section that exemplarily shows an X-X section of FIG. 5A.
Figure 5C:
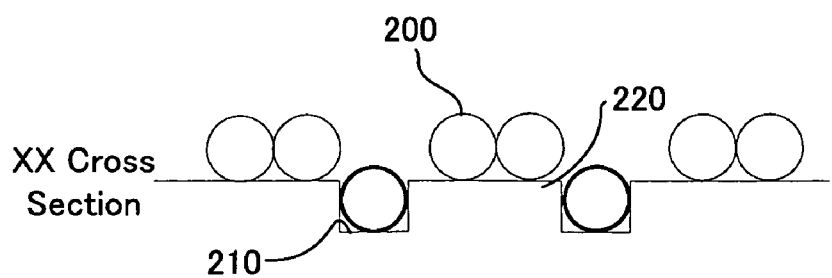
FIG. 5C is a schematic cross section that exemplarily shows another X-X section of FIG. 5A.

FIGS. 5A to 5C exemplarily explain relations between the width of convexoconcave lines and alignments of fine particles. FIGS. 5B and 5C show two modes of XX section of FIG. 5A.

As shown in FIG. 5B, when the width of concave portion 210 is $(2n+1)r$ (n=2 in FIG. 5B), the width of convex portion 220 is $2nr$ (n=1 in FIG. 5B), and the height of convex portion 220 is shorter than $2r$ (r: radius of fine particles 200), alternatively as shown in FIG. 5C, when the width of concave portion 210 is $2nr$ (n=1 in FIG. 5C), the width of convex portion 220 is $(2n+1)r$ (n=2 in FIG. 5C), and the height of convex portion 220 is less than $2r$ (r: radius of fine particles 200), the fine particles are arranged into monolayer on the convexoconcave lines. Further, plural regular alignments of fine particles are disposed alternately as shown in FIG. 5A, and the regular alignments are different between adjacent arrays, namely, fine particles 200 are arranged into hexagonal closest packing in regular alignment A and into linearly in regular alignment B.

Figure 6A:
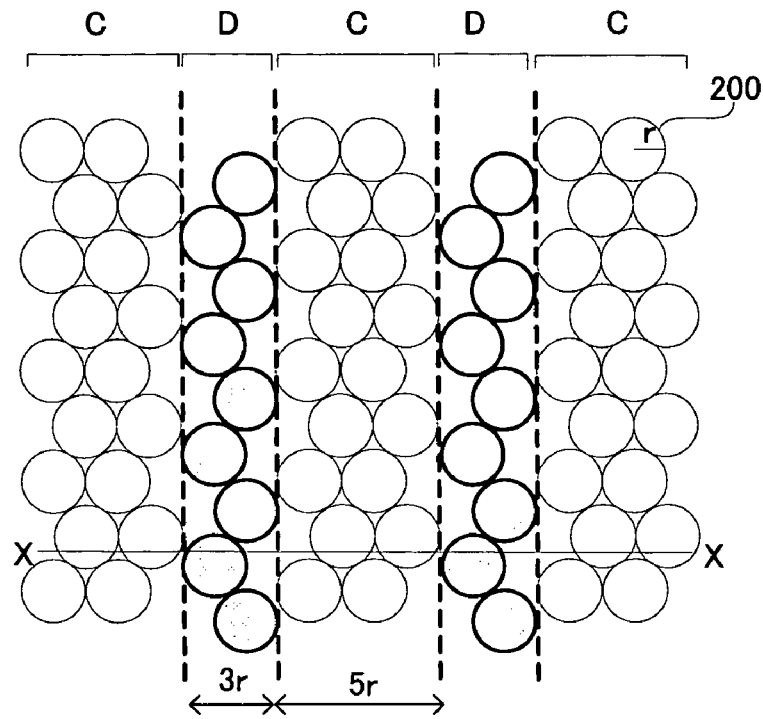
FIG. 6A is a schematic view that exemplarily explains another relation between the widths of convexoconcave lines and alignments of fine particles.
Figure 6B:
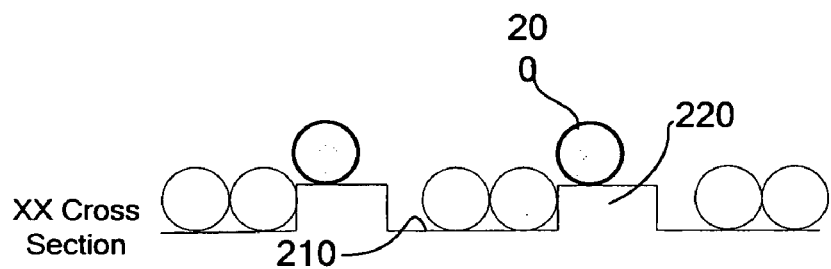
FIG. 6B is a schematic cross section that exemplarily shows an X-X section of FIG. 6A.
Figure 6C:
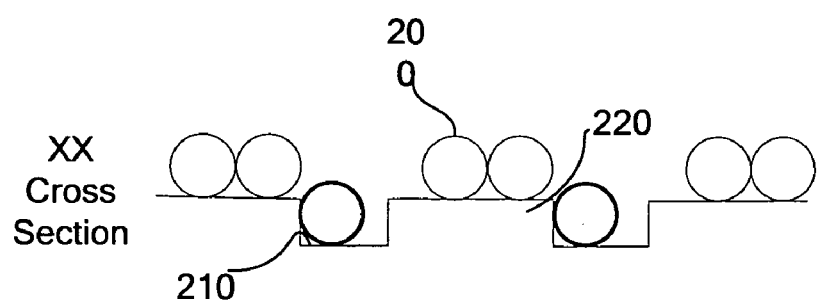
FIG. 6C is a schematic cross section that exemplarily shows another X-X section of FIG. 6A.

FIGS. 6A to 6C exemplarily explain relations between the width of convexoconcave lines and alignments of fine particles. FIGS. 6B and 6C show two modes of XX section of FIG. 6A.

As shown in FIG. 6B, when the width of concave portion 210 is $(2n+1)r$ (n=2 in FIG. 6B), the width of convex portion 220 is also $(2n+1)r$ (n=1 in FIG. 6B), and the height of convex portion 220 is less than $2r$ (r: radius of fine particles 200), alternatively as shown in FIG. 6C, when the width of concave portion 210 is $(2n+1)r$ (n=1 in FIG. 6C), the width of convex portion 220 is also $(2n+1)r$ (n=2 in FIG. 6C), and the height of convex portion 220 is less than $2r$ (r: radius of fine particles 200), the fine particles are arranged into monolayer on the convexoconcave lines. Further, plural regular alignments of fine particles are disposed alternately as shown in FIG. 6A, and the regular alignments are different between adjacent arrays, namely, fine particles 200 are arranged into hexagonal closest packing in regular alignment A and into a zigzag pattern in regular alignment B.

The method for forming the convexoconcave lines may be properly selected depending on the application. When the support is metal or metal oxide such as aluminum or alumina, the convexoconcave lines may be formed by, for example, (i) a mold, having such a surface texture that convex lines and spaces are arranged regularly (e.g. concentric or spiral convex lines when the nanohole structure is applied to magnetic desks), is imprint-transferred onto a surface of the support to form the convexoconcave lines in which concave lines and spaces are arranged regularly, (ii) a resin layer or photoresist layer is formed on the support, then the metal layer or metal oxide layer is subjected to patterning and etching by a conventional photo process or mold-imprint process, thereby convexoconcave lines are formed on the surface of the support, or (iii) grooves or concave lines are formed directly onto the support.

When the support is of various polymers such as plastics, the convexoconcave lines may be formed by, for example, (i) a mold having such a surface texture that convex lines and spaces are arranged regularly (e.g. concentric or spiral convex lines when the nanohole structure is applied to magnetic desks) is thermal-imprint-transferred onto a surface of the support to form the convexoconcave line in which concave lines and spaces are arranged regularly, (ii) convexoconcave lines are formed by way of an injection molding process using a mold similar to that of (i), or (iii) a pattern is transferred by use of a mold similar to that of (i) or (ii) and a photocuring resin.

The material, shape, and size of the fine particles may be properly selected depending on the application.

Preferably, the material of the fine particles comprises one of organic polymers, metals, metal oxides, and metal hydroxides. More specifically, the fine particles comprise at least one of silica, ITO, and gold. The fine particles may be at least one of various fine particles of organic polymers, metal oxides, and metal hydroxides on which the surface ITO or gold is coated.

Preferably, the shape of the fine particles is spherical since origins for forming nanoholes are available and a monolayer of particles is obtainable in a closest condition.

Preferably, the average particle size of the fine particles is approximately the same as the size of the nanohole pitch since origins for forming nanoholes are available. Specifically, the average particle size of the fine particles is preferably 7 nm to 100 nm, more preferably 7 nm to 25 nm.

When the average particle size of the fine particles is less than 7 nm, nanoholes may be hardly formed into a desirable pitch through the anodization process, and when the average particle size is above 100 nm, the capacity may be insufficient for use as magnetic disks.

The particle size distribution of the fine particles is preferably to be narrow, namely, the variation coefficient is preferably as small as possible, specifically, the variation coefficient is preferably 10% or less, more preferably 5% or less, and most preferably 0%.

When the variation coefficient is above 10%, the crystallinity may be lowered within the particle surface, thus resulting possibly in lower regularity of magnetism signal pulses from individual magnetic materials and deterioration of S/N ratio in a case that the nanohole structures are conclusively applied to the magnetic recording media such as hard disks.

The variation coefficient indicates the degree of fluctuation of observed data around an average, which can be calculated from the following equation:

$$\text{Variation Coefficient} = \text{Standard Deviation} \sigma / \text{Average} <X> \times 100$$

The pattern of aligned fine particles may be properly selected depending on the application. The pattern is preferably hexagonal closest packing, for example. The aligned pattern of hexagonal closest packing can be easily achieved since the fine particles tend to form the pattern spontaneously when the fine particles are aligned into a monolayer configuration.

The method for arranging the fine particles into a monolayer configuration may be properly selected depending on the application; for example, the method may be a pull-up method or centrifugal method. Preferably, the method is a centrifugal method owing to the convenience and shorter period of processing.

The pull-up method may form a film of fine particles through vertically immersing the support into a solution, which dissolves the fine particles within a solvent, then mechanically pulling up the support, thereby forming a film of the fine particles.

The rate for pulling up the support may be properly selected depending on the application; for example, when the solution is of fine particles having an average particle diameter of 60 nm and the concentration is 1% by mass, the rate for pulling up is preferably 0.1 mm/min to 0.2 mm/min, which possibly leading to a monolayer alignment of fine particles and also more perfect crystallinity.

The centrifugal method may form a hexagonal closest packing of fine particles in monolayer, through immersing the support into a dispersion of the fine particles, centrifuging the dispersion, and pressure-bonding the fine particles onto the support. More specifically, the dispersion of the fine particles is poured into a centrifuging tube, the support is placed at the bottom of the centrifuging tube, and the centrifugal machine is actuated and rotated, thereby a monolayer of the fine particles is formed in a closest packing condition on the support.

Such a centrifugal method is likely to bring about a film of fine particles having a domain structure since the resultant film has no anisotropy, thus single crystal films are unfavorably difficult to yield. However, the method for producing a stamper according to the present invention may efficiently produce single crystal films since convexoconcave lines are previously formed on the support and the fine particles are arranged along the convexoconcave lines.

When the centrifugal method is carried out by use of the centrifugal machine, the rotation frequency may be properly selected depending on the application; for example, the rotation frequency is 15,000 rpm (13,000 G) or more. When the rotation frequency is below 15,000 rpm, the condition of fine particles aligned into monolayer may be out of the closest condition.

The period for rotating the centrifugal machine may be properly selected depending on the application; for example, the period is preferably 5 minutes to 120 minutes, more preferably 5 minutes to 60 minutes. When the rotating period is shorter than 5 minutes, the aligned condition of monolayer of fine particles may be out of the closest condition, and when the rotating period is longer than 120 minutes, a large part of fine particles in the dispersion may be settled out after the period, thus additional period may be consumed for assuring a certain throughput.

The procedures described above may form convexoconcave lines on the support, and a pattern of the fine particles is arranged on the convexoconcave line in a monolayer configuration.

Preferably, the support is immersed into an alcohol such as methanol after the fine particles are arranged by the centrifugal method thereby to remove the fine particles adsorbed excessively, and preferably is dried naturally under room temperatures.

—Pattern Transfer Step—

In the pattern transfer step, the pattern of aligned fine particles formed in the pattern forming step is transferred onto the stamper forming material.

The pattern of aligned fine particles, which is arranged by the pattern forming step described above, is formed from convex portions (i.e. semi-spherical portions of the fine particles) arranged into regular alignments of hexagonal closest packing, and the regular alignments are different between adjacent arrays and are alternately disposed. The pattern of aligned fine particles can be appropriately utilized for nanohole-forming origins that perform as starting points for forming nanoholes, since the pattern of aligned fine particles has convex portions of hexagonal closest packing.

The material of the stamper may be properly selected depending on the application, for example, may be photo-curable polymers, Ni, SiC, Si, or $SiO_2$. These may be used alone or in combination. Preferably, Ni is employed since higher durability may be achieved under continuous usage and plural stampers are easily reproduced from an original plate by use of thicker plating.

The optical polymer may be properly selected depending on the application, for example, may be acrylic optical-curable polymers or epoxy optical-curable polymers. Among these, acrylic optical-curable polymers are preferable from the viewpoint of transfer property and flowability.

Preferably, the material of the stamper is selected depending on the method to form nanohole origins into the metal or metal-compound base material described above. The method to form nanohole origins may be carried out by direct print, thermal imprint, or optical imprint by use of stampers according to the present invention. These methods will be exemplarily explained in the following with reference to figures.

Figure 7A:
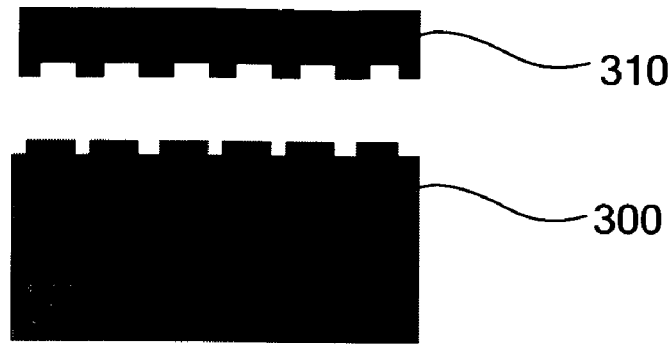
FIG. 7A is a schematic view that exemplarily explains a process for transferring fine particles into an alignment pattern by a direct print process.

In the method to form nanohole origins by way of the direct print, as shown in FIG. 7A, concave portions are formed by pressing directly the stamper 310 according to the present invention onto the metal or metal-compound base material 300 such as of aluminum at higher pressure of about 1 ton/$cm^2$ to 5 ton/$cm^2$. In this method, higher hardness materials are preferable for the material of stampers; for example, metals or ceramics such as SiC are preferable. Among these, metals are preferable in particular due to easy reproduction.

Figure 7B:
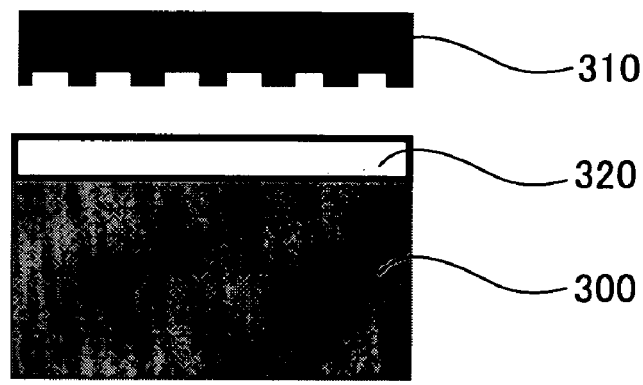
FIG. 7B is a schematic view that exemplarily explains a process for transferring fine particles into an alignment pattern by a thermal imprint process.

In the method to form nanohole origins by way of the thermal imprint, as shown in FIG. 7B, concave portions are formed by providing thermoplastic polymer layer 320 such as of resists and PMMA on the metal or metal-compound base material 300, then pressing the stamper 310 according to the present invention onto the thermoplastic polymer layer 320 at temperature higher than the softening temperature of the polymer (e.g. about 100° C. to 200° C.) and moderate pressure of about 50 kg/$cm^2$ to 1 ton/$cm^2$. In this method, materials having higher hardness to moderate hardness and appropriate thermal resistance are preferable for the material of stampers, for example, metals or ceramics such as Si, SiC, and $SiO_2$ are preferable. Among these, metals are preferable in particular due to easy reproduction.

Figure 7C:
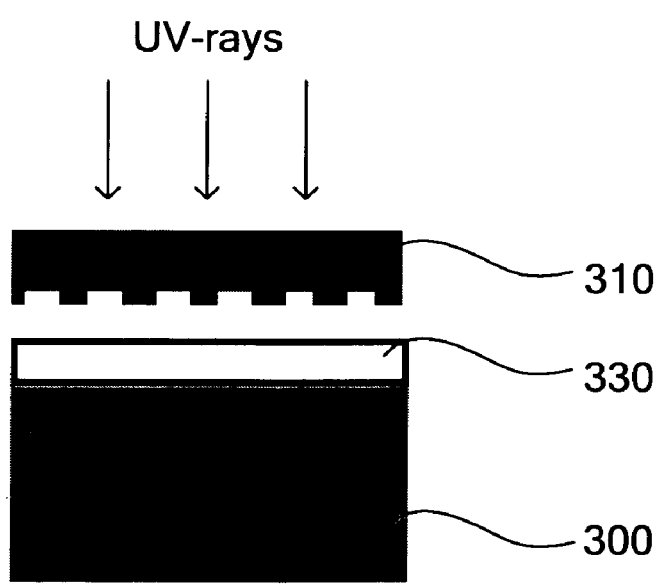
FIG. 7C is a schematic view that exemplarily explains a process for transferring fine particles into an alignment pattern by an optical imprint process.

In the method to form nanohole origins by way of the optical imprint, as shown in FIG. 7C, concave portions are formed by providing photo polymer layer 330 on the metal or metal-compound base material 300, irradiating UV-rays onto the photo polymer layer 330 using the stamper 310 according to the present invention as a mask, thereby patterning is performed. In this method, the material of the stamper is preferably transparent so as to transmit UV-rays, for example, $SiO_2$ and polymers are preferable. Among these, polymers are preferable in particular due to easy reproduction.

Figure 7D:
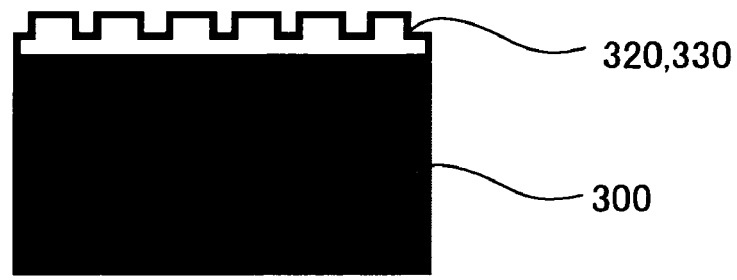
FIG. 7D is a schematic view that exemplarily explains a step for peeling a polymer layer in the thermal imprint and the optical imprint.
Figure 7E:
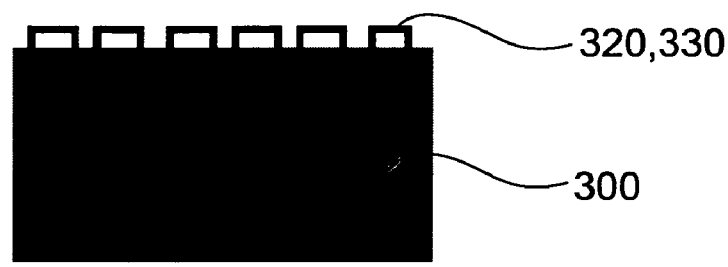
FIG. 7E is a schematic view that exemplarily explains residual treatment in the thermal imprint and the optical imprint.
Figure 7F:
FIG. 7F is a schematic view that exemplarily explains etching treatment in the thermal imprint and the optical imprint.

In the methods by way of the thermal or optical imprint, after separating stamper 310 as shown in FIG. 7D, residues or remainders are removed by $O_2$ plasma ashing as shown in FIG. 7E, then etching is carried out by way of chlorine dry treatment or chlorine wet treatment, thereby convex portions are formed on the metal or metal-compound base material 300.

The method for transferring the pattern of aligned fine particles may be properly selected depending on the application; for example, the transfer may be carried out in the case that the material of the stamper is Ni. An optical-curable polymer layer is formed by coating the optical-curable polymer on the fine particles aligned on the support, and a transparent glass plate is disposed on the optical-curable polymer layer, then UV-rays are irradiated onto the optical-curable polymer layer and the support is peeled away. In this method, the convex portions of the pattern of aligned fine particles, which are semi-spherical portions of fine particles, are transferred to the cured optical-curable polymer layer, thereby concave portions of hexagonal closest packing are formed in a pattern capable of engaging with the convex portions. The resultant optical-curable polymer layer may be utilized as a photo polymer stamper according to the present invention.

Then, the pattern of aligned fine particles is transferred, and a metal is vapor-deposited to about 10 nm to 50 nm thick as a plating electrode on the surface of the optical-curable polymer layer having concave portions. The metal electrode, which also acts as a contacting surface at the mold-pressing process, is required to be of lower resistance and higher hardness, thus formed from metals having higher hardness such as Ni, Ti, and Cr. Among these, Cr is preferable since the hardness is higher.

In addition, metal is plated in a larger thickness such as 200 µm to 10,000 µm onto the surface of the pattern of aligned fine particles formed of the optical-curable polymer to which the electrodes are vapor-deposited, then the optical-curable polymer layer is peeled, thereby resulting in the stamper formed of a metal such as Ni according to the present invention. Concerning the metal, Ni and Cr are preferable since plating can easily provide these materials with higher hardness, in particular Ni is preferable since plating can be easily provided with larger thickness.

The procedures described above may transfer the pattern of aligned fine particles, obtained in the pattern-forming process, onto the material of stampers.

The stamper, obtained by the method for producing a stamper according to the present invention, comprises plural arrays of spherical portions, the plural arrays of spherical portions are respectively arranged into regular alignments, the regular alignments are different between adjacent arrays.

The height of convex portions may be properly selected depending on the application; preferably, the thickness is 10 nm or more, and more preferably 20 nm to 100 nm, when the nanohole structure formed by the stamper is applied to the magnetic recording media such as hard discs.

When the height of convex portions is less than 10 nm, the nanoholes may act as the origins insufficiently and indefinitely at transferring onto the surface of aluminum film, thus the alignment of the resultant nanoholes is likely to be defective. On the other hand, when the height of convex portions to the space of convex portions, i.e. aspect ratio, is excessively large, deformations and/or fractures often generate at convex portions of stampers during transfer steps. Accordingly, the aspect ratio is preferably 1.2 or less, for example, the height of convex portions is 20 nm to 100 nm when the pitch of nanoholes is 10 nm to 50 nm.

The stampers according to the present invention comprise regular alignments of nanoholes arranged into different between adjacent alignments, and the regular alignments are alternately disposed, therefore, the stampers according to the present invention may conveniently and effectively produce nanohole structures of nanohole arrangement that affords easy tracking, thus may appropriately utilized for the method for producing nanohole structures according to the present invention.

(Method for Producing Nanohole Structure)

The method for producing nanohole structures according to the lo present invention, which produces the nanohole structures according to the present invention, comprises a step for forming a stamper, a step for forming nanoholes, and other optional steps properly selected depending on requirements.

—Step for Forming Stamper—

In the step for forming a stamper, convexoconcave lines are formed on a support, fine particles are arranged into a monolayer on the convexoconcave lines in a patterned configuration, the pattern of aligned fine particles is transferred onto the material of stampers, consequently the stamper is produced. The step for forming a stamper may be carried out more appropriately by the method for producing a stamper according to the present invention described above.

The details of the support, convexoconcave lines, fine particles, and the material of stampers are the same as those described above.

—Step for Forming Nanoholes—

In the step for forming the nanoholes, the origins for forming nanoholes are formed on the metal or metal-compound base material by use of the stamper obtained through the step for forming a stamper, then nanoholes are formed on the metal or metal-compound base material.

In the step for forming the nanoholes, the origins for forming nanoholes are preferably formed onto the metal or metal-compound base material by use of the stamper according to the present invention from the viewpoint of lower cost and easy processing; alternatively, the step for forming the nanoholes may be carried out by use of an electron-beam lithography system.

The method for producing origins for forming nanoholes by use of the stamper may be carried out in the same way as explained with respect to the selection of material for forming stampers in the method for producing a stamper according to the present invention.

The process for forming nanoholes may be properly selected depending on the application as long as a porous layer, in which the plural nanoholes are formed in approximately perpendicular direction to the metal or metal-compound base material, can be formed on the metal or metal-compound base material. Preferably, the porous layer is formed by way of an anodization process after a layer of metal material is formed by a spattering method, vapor deposition method or the like. The process for forming nanoholes and the process for forming nanoholes may be the same as those described in terms of the nanohole structures.

The procedures described above may produce a porous layer or nanohole structure on the metal or metal-compound base material, in which plural nanoholes are formed in approximately perpendicular direction to the metal or metal-compound base material, the plural regular alignment of the nanoholes are alternately disposed adjacently in a regular alignment of hexagonal closest packing, and the plural regular alignments of the nanoholes are different each other. Therefore, when the nanohole structure is applied to magnetic recording media, the tracking can be easily carried out by making use of the difference of the regular alignments in the arranged pattern between the adjacent regular alignments.

Figure 8A:
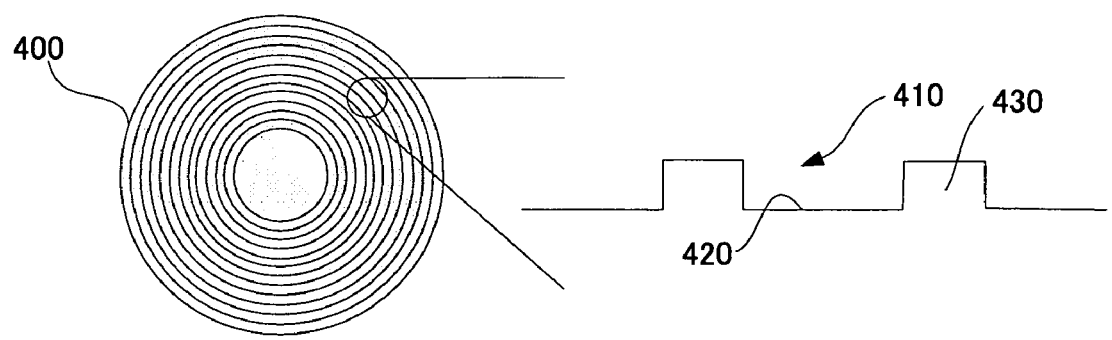
FIG. 8A is a schematic view that exemplarily explains a disk support on which convexoconcave lines are formed.

The method for forming a nanohole structure according to the present invention will be explained with reference to figures. As shown in FIG. 8A, concentric convexoconcave line 410 is drawn on. support 400 having a disc shape through a patterning step and an etching step by use of an electron-beam lithography system. The widths of the concave portion 420 and convex portion 430 of the convexoconcave line 410 are the same as described above. Then the support 400, to which the convexoconcave line has been formed, is immersed within a dispersion containing fine particles, and is subjected to centrifugal separation by a centrifugal process, thereby the fine particles 450 are arranged into monolayer configuration on the surface of the support. The fine particles 450 represent a hexagonal closest packing, and the regular alignments of the concave portions and convex portions are different between adjacent arrays.

Figure 9A:
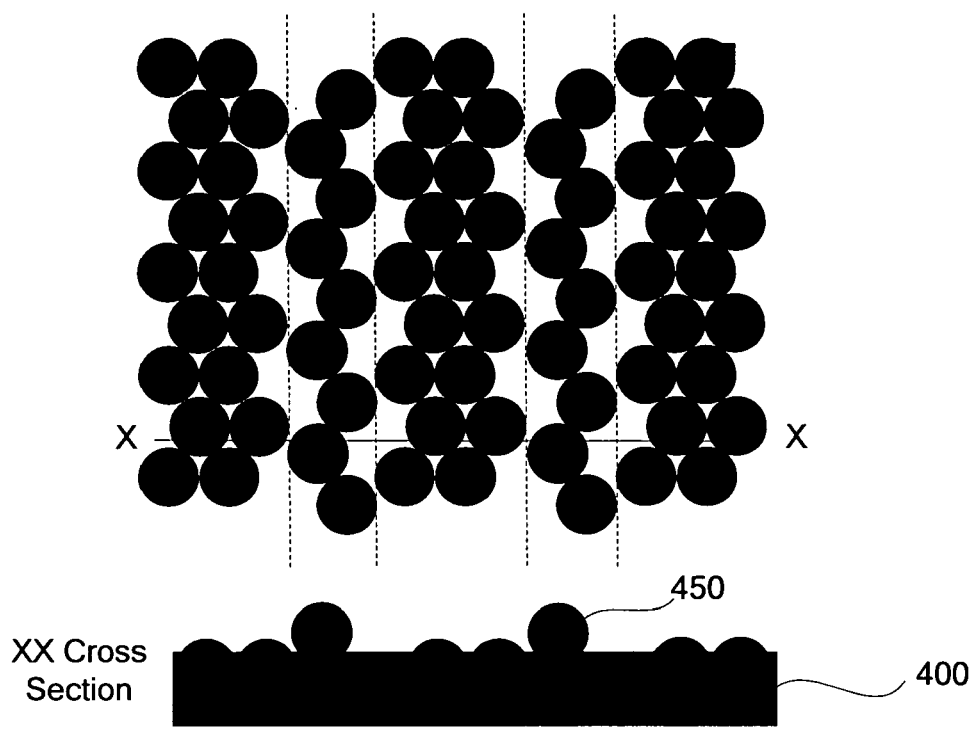
FIG. 9A is a schematic view that exemplarily shows the first step for producing a stamper utilized for producing a nanohole structure according to the present invention.
Figure 9B:
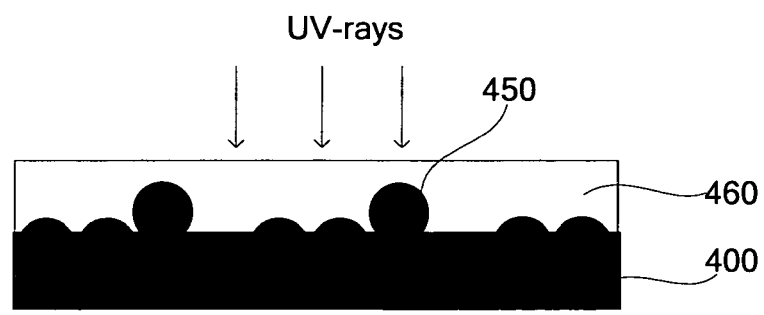
FIG. 9B is a schematic view that exemplarily shows the second step for producing a stamper utilized for producing a nanohole structure according to the present invention.
Figure 9C:
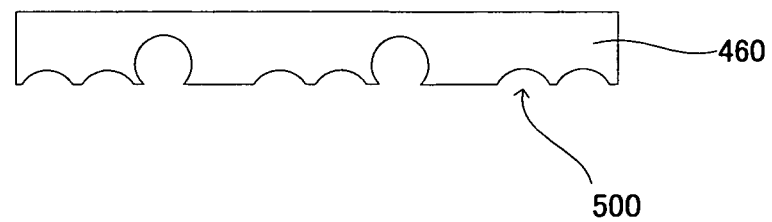
FIG. 9C is a schematic view that exemplarily shows the third step for producing a stamper utilized for producing a nanohole structure according to the present invention.

Then as shown FIG. 9A, an optical-curable polymer is coated by, for example, a spin-coating process over fine particles 450 arranged in a monolayer configuration on the support 400, thereby an optical-curable layer 460 is formed as shown in FIG. 9B. Then, a transparent glass plate (not shown) is disposed on the optical-curable polymer layer, and UV-rays are irradiated onto the optical-curable polymer layer by use of an exposure apparatus, then the support is peeled away. As a result, the pattern of the regularly aligned fine particles 450 is transferred to the cured optical-curable polymer layer 460 as shown in FIG. 9C, thereby regularly arranged concave portions 500 are formed in a pattern capable of engaging with the spherical portions of the fine particles.

Figure 9D:
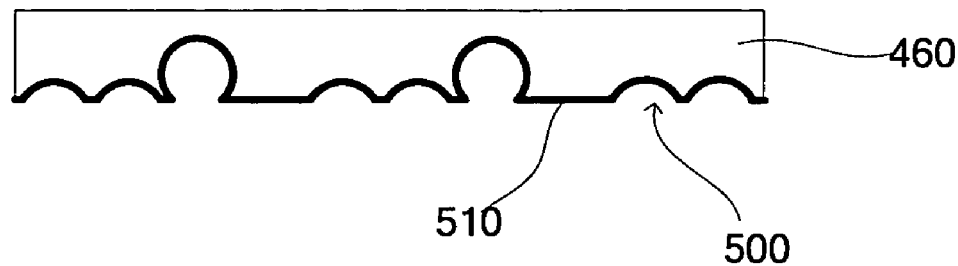
FIG. 9D is a schematic view that exemplarily shows the fourth step for producing a stamper utilized for producing a nanohole structure according to the present invention.

Further, an electrode of Cr 510 is vapor-deposited onto the surface of the optical-curable polymer layer 460 where the shape of fine particles 450 is transferred and concave portions 500 are formed, as shown in FIG. 9D, Ni is plated to a larger thickness using the vapor-deposited Cr as the electrode and a bath of sulfamic acid thereby to form Ni plating 520, thereafter the cured optical-curable polymer layer 460, consequently, stamper 550 according to the present invention may be obtained that has spherical convex portions 530 corresponding to the pattern of the aligned fine particles 450. These procedures correspond to the step for forming a stamper.

Figure 10A:
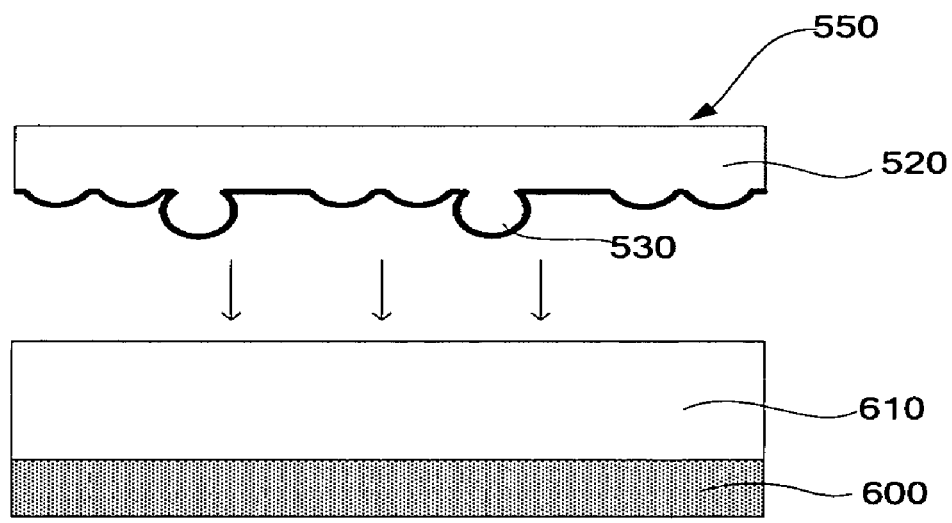
FIG. 10A is a schematic view that exemplarily shows the first step for forming nanoholes in the method for producing a nanohole structure according to the present invention.

Next, a soft-magnetic underlayer (not shown) is formed on the smooth substrate 600 for magnetic disks by way of spattering processes etc., and an aluminum film is formed, then the stamper 550 formed in the step for forming a stamper is pressed onto the aluminum film 610 at a pressure of about 10,000 N/cm$^2$ to 50,000 N/cm$^2$ (1 ton/cm$^2$ to 5 ton/cm$^2$) as shown in FIG. 10A, thereby the pattern of aligned fine particles 450 of the origins for forming nanoholes is produced. Then the aluminum film is subjected to anodization, thereby porous layer 630 of alumite pores is formed in which a number of nanoholes 620 of alumite pores are formed in a direction approximately perpendicular to the substrate 600. The porous layer 630, which corresponds to the nanohole structure according to the present invention, is formed from the plural arrays of nanoholes 620 of alumina pores are respectively arranged into regular alignments, the regular alignments are different between adjacent arrays, and the regular alignments are alternately disposed as shown in FIG. 10C. These procedures correspond to the step for forming nanoholes.

The method for producing a nanohole structure according to the present invention may effectively and economically produce the nanohole structures according to the present invention.

(Magnetic Recording Medium)

The magnetic recording media according to the present invention comprise a substrate and a porous layer and may further comprise any other layers selected according to requirements.

The porous layer preferably comprises plural nanoholes extending in a direction substantially perpendicular to the substrate plane and is preferably the above-described nanohole structure. The details of the nanohole structure have been described above.

The thickness of the porous layer may be properly selected depending on the application; preferably, the thickness is 500 nm or less, and more preferably 5 nm to 200 nm. A thickness of the porous layer exceeding 500 nm may prevent satisfactory inserting of the magnetic material into the nanoholes.

The nanoholes in the porous layer or nanohole structure may be through holes penetrating the porous layer, alternatively be pits or recessed portions not penetrating the porous layer. In the case where a magnetic material is charged or inserted into the nanohole to form a magnetic layer, and another magnetic layer is further formed under the former magnetic layer, the nanoholes are preferably through holes.

The nanoholes are preferably inserted with at least one magnetic material to form at least one magnetic layer inside thereof.

The magnetic layer(s) can be any suitable one according to the purpose and may be, for example, a ferromagnetic layer and a soft-magnetic layer. It is preferred that the soft-magnetic layer and the ferromagnetic layer are arranged inside the nanoholes in this order from the substrate. Where necessary, a nonmagnetic layer of interlayer may be formed between the ferromagnetic layer and the soft-magnetic layer.

The shape, structure, size, and material of the substrate may be properly selected depending on the application. The substrate preferably has a disk shape when the magnetic recording medium is a magnetic disk such as a hard disk. The structure may be a single layer structure or a multilayer structure. The material can be selected from conventional materials for substrates of magnetic recording media and can be, for example, aluminum, glass, silicon, quartz, or $SiO_2/Si$ (silicon comprising thermal oxide film thereon). These materials may be used alone or in combination. The substrate may be prepared in situ or a commercially available product.

The ferromagnetic layer performs as a recording layer in the magnetic recording medium and constitutes magnetic layers together with the soft-magnetic layer.

The material of the ferromagnetic layer may be properly selected from conventional ones; examples thereof include Fe, Co, Ni, FeCo, FeNi, CoNi, CoNiP, FePt, CoPt and NiPt. These materials may be used alone or in combination.

The thickness of the ferromagnetic layer may be properly selected depending on the linear recording density etc. unless significant adverse effect on the present invention. For example, the thickness is preferably (1) no more than the thickness of the soft-magnetic layer; (2) one-third to three times the minimum bit length defined by the linear recording density utilized at recording; or (3) no more than the total thickness of the soft-magnetic layer and the soft-magnetic underlayer. Specifically, the thickness of the ferromagnetic layer is preferably 5 nm to 100 nm, and more preferably 5 nm to 50 nm. When magnetic recording is performed at a linear recording density of 1,500 kBPI and with a target density of 1 $Th/in^2$, the thickness is preferably 50 nm or less, more preferably approximately 20 nm.

The thickness of the "ferromagnetic layer" means a total of individual ferromagnetic layers when the ferromagnetic layer comprises plural continuous layers or plural separated layers, for example, in the case where the ferromagnetic layer is partitioned by one or more intermediate layers such as nonmagnetic layers and constitutes discontinuous separated ferromagnetic layers. The thickness of the "soft-magnetic layer" means a total thickness of individual soft-magnetic layers when the soft-magnetic layer comprises plural continuous layers or plural separated layers, for example, in the case where the soft-magnetic layer is partitioned by one or more intermediate layers such as nonmagnetic layers and constitutes discontinuous soft-magnetic layers. The "total thickness of the soft-magnetic layer and the soft-magnetic underlayer" means a total of individual soft-magnetic layer and soft-magnetic underlayer when at least one of the soft-magnetic layer and the soft-magnetic underlayer comprises plural continuous layers or plural separated layers, for example, in the case where the soft-magnetic layer or the soft-magnetic underlayer is partitioned by one or more intermediate layers such as nonmagnetic layers and constitutes discontinuous soft-magnetic (under) layers.

According to the magnetic recording media according to the present invention, the distance between the single pole head and the soft-magnetic layer in magnetic recording can be less than the thickness of the porous layer and substantially equal to the thickness of the ferromagnetic layer. Thus, the convergence of a magnetic flux from the single pole head and the optimum properties for magnetic recording and reproduction at a recording density in practice can be controlled only by controlling the thickness of the ferromagnetic layer, regardless of the thickness of the porous layer. The magnetic recording media exhibit significantly increased write efficiency, require a decreased write current and have remarkably improved overwrite properties as compared with conventional equivalents.

The ferromagnetic layer can be formed by suitable procedures such as electrodeposition.

The soft-magnetic layer can be formed from suitable materials depending on the application such as NiFe, FeSiAl, FeC, FeCoB, FeCoNiB and CoZrNb. These materials may be used alone or in combination.

The thickness of the soft-magnetic layer may be properly selected within a range unless significant adverse effect on the present invention and may be determined depending on the depth of nanoholes in the porous layer and the thickness of the ferromagnetic layer. For example, (1) the thickness of the soft-magnetic layer may be larger than the thickness of the ferromagnetic layer, or (2) the total thickness of the soft-magnetic layer and the soft-magnetic underlayer may be larger than the thickness of the ferromagnetic layer.

The soft-magnetic layer may effectively converge the magnetic flux from the magnetic head in magnetic recording to the ferromagnetic layer thereby to increase advantageously the vertical component of magnetic field of the magnetic head. The soft-magnetic layer as well as the soft-magnetic underlayer may appropriately constitute a magnetic circuit of recording magnetic field supplied from the magnetic head.

Preferably, the soft-magnetic layer has an easy-magnetization axis in a direction substantially perpendicular to the substrate plane. Thus, in magnetic recording using a perpendicular magnetic recording head, the convergence of a magnetic flux from the perpendicular magnetic recording head and the optimum properties for magnetic recording and reproduction at a recording density in practice can be controlled and the magnetic flux converges to the ferromagnetic layer. As a result, the magnetic recording media exhibit significantly increased write efficiency, require a decreased write current, and have markedly improved overwrite properties as compared with conventional ones.

The soft-magnetic layer may be formed by suitable procedures such as electrodeposition.

The nanoholes in the porous layer may further include a nonmagnetic layer of interlayer between the ferromagnetic layer and the soft-magnetic layer. The nonmagnetic layer of interlayer performs to reduce the action of an exchange coupling force between the ferromagnetic layer and the soft-magnetic layer to thereby control and adjust the reproduction properties in magnetic recording at desired levels.

The material for the nonmagnetic layer may be suitable one selected from conventional materials such as Cu, Al, Cr, Pt, W, Nb, Ru, Ta and Ti. These materials may be used alone or in combination.

The nonmagnetic layer may have a suitable thickness depending on the application. The nonmagnetic layer may be formed by suitable procedures such as electrodeposition.

The magnetic recording media according to the present invention may further comprise a soft-magnetic underlayer between the substrate and the laminate structure.

The material of the soft-magnetic underlayer may be properly selected from conventional ones, for example, from those exemplified as the materials for the soft-magnetic layer. These materials may be used alone or in combination. The material of the soft-magnetic underlayer may be the same as or different from that of the soft-magnetic layer.

Preferably, the soft-magnetic underlayer possesses an easy-magnetization axis along an in-plane direction of the substrate. In such a construction, magnetic flux from the magnetic head for recording effectively closes to form a magnetic circuit, thereby enabling to increase the vertical component of the magnetic field of the magnetic head. The soft-magnetic underlayer may effectively be employed even in single-domain recording at a bit size or aperture diameter of the nanoholes of 100 nm or less.

The soft-magnetic underlayer may be formed by a conventional method such as electrodeposition process or electroless plating process.

The magnetic recording media may further comprise one or more other layers depending on the application; examples thereof include an electrode layer and protective layer.

The electrode layer performs as an electrode in the formation of the magnetic layer, i.e. the ferromagnetic layer and soft-magnetic layer, by way of electrodeposition etc. and is typically arranged on the substrate and under the ferromagnetic layer. In the step for forming the magnetic layer by electrodeposition, the soft-magnetic underlayer etc. may be utilized as the electrode rather than the electrode layer.

The material of the electrode layer may be properly selected depending on the application; example thereof include Cr, Co, Pt, Cu, Ir, Rh, and alloys thereof. These materials may be used alone or in combination. The electrode layer may comprise other substances such as W, Nb, Ti, Ta, Si and O in addition to the above-described materials.

The thickness of the electrode layer may be properly selected depending on the application. The magnetic recording media may comprise one or more of such electrode layers. The electrode layer may be formed by conventional methods such as sputtering and vapor deposition.

The protective layer performs to protect the ferromagnetic layer and is arranged on or above the ferromagnetic layer. The magnetic recording media may comprise one or more of such protective layers which have a single-layer structure or multilayer structure.

The protective layer may be formed from properly selected materials depending on the application, such as diamond-like carbon (DLC).

The thickness of the protective layer may be properly selected depending on the application. The protective layer may be formed by a properly selected conventional process such as plasma CVD or coating.

The magnetic recording media according to the present invention may be applied to various magnetic recording by a magnetic head, preferably to magnetic recording by a single magnetic-pole head, in particular to magnetic recording devices and methods described later.

The magnetic recording media according to the present invention, having a nanohole structure according to the present invention, can provide easy tracking without problems such as cross-read and cross-write, can perform high-density recording and high-velocity recording with higher capacity without increasing write current at magnetic heads, and can exhibit excellent overwrite properties, uniform properties, lower noise, superior thermaffluctuation resistance, and higher quality. Accordingly, the magnetic recording media may be designed and utilized as various magnetic recording media, for example, may be designed and utilized as hard disk devices utilized commercially in various products such as external memory devices of computers and recording devices of public videos, and also may be preferably designed and utilized as magnetic disks such as hard disks in particular.

The magnetic recording media according to the present invention may be produced by conventional methods selected properly, preferably by the method for producing the magnetic recording medium according to the present invention described as follows.

(Method for Manufacturing Magnetic Recording Media)

The method for manufacturing a magnetic recording medium according to the present invention is a method for manufacturing the magnetic recording media according to the present invention. The method includes a nanohole structure forming process (porous layer forming process), a magnetic material charging process and preferably a polishing process and may further include one or more of other processes such as a soft-magnetic underlayer forming process, electrode layer forming process, nonmagnetic layer forming process, and protective layer forming process.

The soft-magnetic underlayer forming process is carried out depending on requirements, in which a soft-magnetic underlayer is formed on the substrate. The substrate can be any of the above-described substrates.

The soft-magnetic underlayer can be formed according to a conventional procedure such as sputtering, vapor deposition or another vacuum film forming procedure, as well as electrodeposition or electroless plating. According to the soft-magnetic underlayer forming process, the soft-magnetic underlayer is formed with a desired thickness on or above the substrate.

In the electrode layer forming process, an electrode layer is formed between the nanohole structure and the soft-magnetic underlayer.

The electrode layer can be formed according to a conventional procedure, such as sputtering or vapor deposition, under any suitable conditions depending on the application.

The electrode layer formed by the electrode layer forming process serves as an electrode in the formation of at least one of a soft-magnetic layer, nonmagnetic layer and ferromagnetic layer by electrodeposition.

The nanohole structure forming process or porous layer forming process comprises forming a metal layer made of a metal material on or above the substrate or the soft-magnetic underlayer when formed, and subjecting the metal layer to a nanohole forming treatment such as anodization to form a plurality of nanoholes extending in a direction substantially perpendicular to the substrate plane to thereby form a nanohole structure or porous layer.

The metal material may be one of the above-described metal materials. Among them, alumina or aluminum oxide and aluminum are preferable, and aluminum is preferable in particular.

The metal layer can be formed by conventional methods, such as sputtering or vapor deposition under proper conditions depending on the application. The sputtering can be carried out by using a target made of the corresponding metal material. The target used herein preferably has a high purity, and when the metal material is aluminum, preferably has a purity of 99.990% or more.

The process for forming nanoholes may be properly selected depending on the application; for example may be anodization or etching. Among them, anodization is preferable in particular from the viewpoint that a number of uniform nanoholes can be formed and aligned regularly in a direction substantially perpendicular to the plane of the substrate.

The anodization can be carried out by electrolyzing and etching the metal layer in an aqueous solution of sulfuric acid, phosphoric acid or oxalic acid using an electrode on or above the metal layer as an anode. The soft-magnetic underlayer or the electrode layer, which has been formed prior to the formation of the metal layer, can be used as the electrode.

Preferably, a pattern for forming plural regular alignments of nanoholes is previously formed on the metal layer by use of a stamper on which the pattern is transferred, as explained before in terms of the nanohole structures. The previously formed pattern may advantageously lead to nanoholes formed effectively only on the pattern through the anodization process.

The method for forming the pattern may be properly selected depending on the application as follows, for example.

A stamper is imprint-transferred on a metal layer or metal oxide layer such as of aluminum or alumina, and a pattern is formed on the layer, in which the stamper has such a surface texture that round convexes are arranged into a pattern (e.g. hexagonal closest packing) to form a regular alignment and the plural regular alignments are disposed alternately (when the nanohole structure is applied to magnetic disks, the regular alignments of convexes are arranged concentrically or spirally), and the pattern on the layer has a configuration that circles are arranged into a pattern of hexagonal closest packing and the plural regular alignments are disposed alternately. Also, the pattern may be produced by forming a resin layer or photoresist layer on the metal layer or metal oxide layer, then the metal layer or metal oxide layer is subjected to patterning and etching by a conventional photo process or imprint process, thereby a pattern is formed in which concaves are arranged into a pattern of regular alignment (e.g. hexagonal closest packing) and plural regular alignments are disposed alternately.

The material of the stamper may be properly selected depending on the application, for example, silicon, silicon oxide, and combination thereof are nominated from the viewpoint of widest experiences in the material for forming fine structure in semiconductor fields, and silicon carbide is nominated from the view point of durability under long usage. Further, Ni stampers for forming optical disks may be available. The stamper may be used plural times. The imprint transfer can be carried by conventional procedures depending on the application. The resist materials for the photoresist layer include not only photoresist materials but also electron beam resist materials. The photoresist material for use herein can be suitable materials known in the field of semiconductors, such as materials sensitive to near-ultraviolet rays or near-field light.

The pitch of nanoholes may be properly defined based on the voltage at anodizing processes, the pitch (mm) is typically about 2.5 times of the anodizing voltage (V). Accordingly, the voltage at the anodizing process is preferably 3 V to 40 V, more preferably 3 V to 10 V, but not limited to.

When the voltage is 3 V to 40 V, higher density of the magnetic recording media may be attained; when the voltage is 3 V to 10 V, the pitch of nanoholes may be controlled into 7 nm to 25 nm, resulting advantageously in still higher density of the magnetic recording media.

The anodization may be carried out under properly selected conditions including the type, concentration, and temperature of electrolytes, and the time period for anodization according to the number, size and aspect ratio of the target nanoholes. For example, the electrolyte is preferably a diluted phosphoric acid solution, diluted oxalic acid solution, or diluted sulfuric acid solution. In any case, the aspect ratio of the nanoholes can be controlled by immersing the anodized metal layer in, for example, a phosphoric acid solution to thereby increase the diameter of the nanoholes such as alumina pores.

When the nanohole structure forming process or porous layer forming process is carried out by the anodization, a plurality of nanoholes can be formed in the metal layer. In some cases, a barrier layer may be formed at the bottom of the nanoholes. The barrier layer can be easily removed in accordance with conventional etching procedures using a conventional etchant such as phosphoric acid. Thus, a plurality of the nanoholes can be formed in the metal layer so as to extend in a direction substantially perpendicular to the plane of the substrate and to expose the soft-magnetic underlayer or the substrate from the bottom thereof.

The nanohole structure forming process or porous layer forming process may form the nanohole structure or porous layer on or above the substrate or the soft-magnetic underlayer.

The magnetic material charging process is a process for charging at least one magnetic material into the nanoholes in the nanohole structure or porous layer and may comprise, for example, ferromagnetic layer forming process for charging the ferromagnetic material into the nanoholes, and/or a soft-magnetic layer forming process for charging the soft-magnetic material into the nanoholes.

In the soft-magnetic layer forming process, a soft-magnetic layer is formed inside the nanoholes. The soft-magnetic layer can be formed, for example, by depositing or charging the material for the soft-magnetic layer into the nanoholes typically by electrodeposition.

The electrodeposition may be carried out by suitable procedures under conditions properly selected depending on the application, for example, may be properly carried out by applying a voltage to a solution containing one or more of the materials for the soft-magnetic layer using the soft-magnetic underlayer or the electrode layer as an electrode and precipitating or depositing the material on the electrode.

As a result of the soft-magnetic layer forming process, the soft-magnetic layer is formed on or above the substrate, the soft-magnetic underlayer or the electrode layer into the nanoholes in the porous layer.

The ferromagnetic layer forming process is a process for forming a ferromagnetic layer on or above the soft-magnetic layer or the nonmagnetic layer.

The ferromagnetic layer can be formed, for example, by depositing or charging the material for the ferromagnetic layer on or above the soft-magnetic layer or the nonmagnetic layer into the nanoholes typically by electrodeposition.

The electrodeposition can be carried out by suitable procedures under conditions properly selected depending on the application, for example, can be carried out by applying a voltage to a solution containing one or more of the materials for the ferromagnetic layer using the soft-magnetic underlayer or the electrode layer (seed layer) as an electrode and precipitating or depositing the material inside the nanoholes.

As a result of the ferromagnetic layer forming process, the ferromagnetic layer is formed on or above the soft-magnetic layer or the nonmagnetic layer into the nanoholes of the porous layer.

The nonmagnetic layer forming process is a process for forming a nonmagnetic layer on or above the soft-magnetic layer.

The nonmagnetic layer can be formed, for example, by depositing or charging the material for nonmagnetic layer on or above the soft-magnetic layer inside the nanoholes typically by electrodeposition.

The electrodeposition can be carried out by suitable procedures under conditions properly selected depending on the application, for example, can be carried out by applying a voltage to a solution containing one or more of the materials for the nonmagnetic layer using the soft-magnetic underlayer or the electrode layer as an electrode and precipitating or depositing the material inside the nanoholes.

As a result of the nonmagnetic layer forming process, the nonmagnetic layer is formed adjacent typically to the soft-magnetic layer inside the nanoholes in the porous layer.

The polishing process is a process for polishing and flattening a surface of the nanohole structure or porous layer. By way of removing the surface of the nanohole structure by a certain thickness in the polishing process, higher-density recording and higher-speed recording can be assured, and by way of flattening the surface of the magnetic recording medium in the polishing process, the magnetic head such as a perpendicular-magnetic-recording head can stably float closely over the medium to thereby realize high-density recording with good reliability.

The polishing process is preferably carried out after the magnetic layer forming process including the ferromagnetic layer forming process and the soft-magnetic layer forming process. When the polishing is carried out before the magnetic layer forming process, the nanohole structure may be destroyed and slurry, chips, etc. may be discharged into the nanoholes, inviting possibly plating failure.

In the polishing process, the surface of nanohole structure can be polished by suitable procedures. Suitable examples thereof include CMP and ion milling.

The method for producing a magnetic recording medium may effectively and economically produce the recording media described above according to the present invention.

(Magnetic Recording Device and Magnetic Recording Method)

The magnetic recording device according to the present invention comprises the magnetic recording medium according to the present invention and a perpendicular magnetic recording head, and may further comprise one or more other means or members depending on requirements.

The magnetic recording method according to the present invention comprises recording on the magnetic recording media according to the present invention using a perpendicular magnetic recording head, and may further comprise one or more other steps or treatments depending on requirements. The magnetic recording method is preferably carried out using the magnetic recording device according to the present invention. The other steps or treatments can be carried out using the other means or members. The magnetic recording device as well as the magnetic recording method will be illustrated below.

The perpendicular magnetic recording head may be properly selected depending on the application; preferable example thereof is a single magnetic-pole head. The perpendicular magnetic recording head may be a write-only head or read-write head integrated with a read head such as a giant magneto-resistive (GMR) head.

Figure 2A:
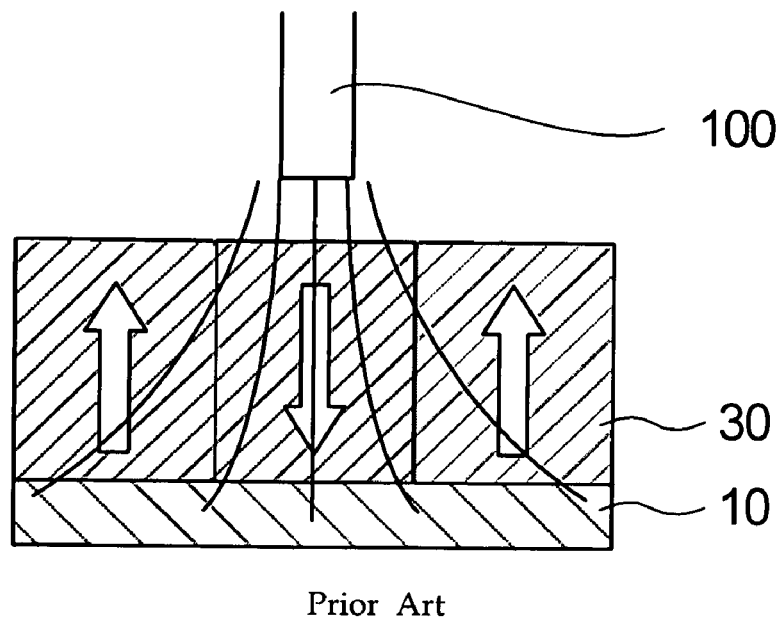
FIG. 2A is an exemplary conception view that schematically explains diffusion of magnetic flux during magnetic recording in a perpendicular recording system.
Figure 2B:
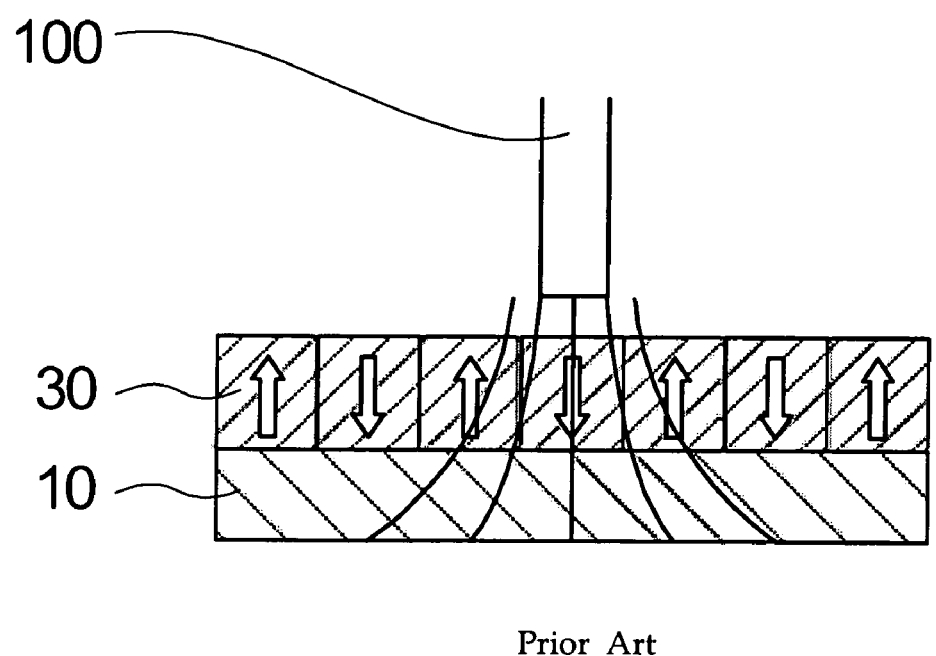
FIG. 2B is an exemplary conception view that schematically explains concentration rather than diffusion of magnetic flux during magnetic recording in a perpendicular recording system.
Figure 3:
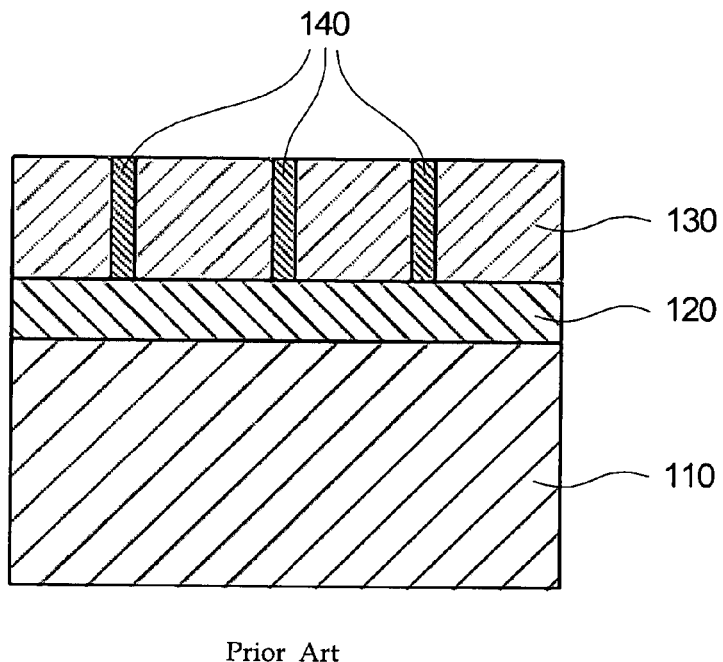
FIG. 3 is an exemplary view that explains a magnetic recording medium, combined with patterned media and a perpendicular recording system, where a magnetic metal is inserted into anodized alumina pores.
Figure 4:
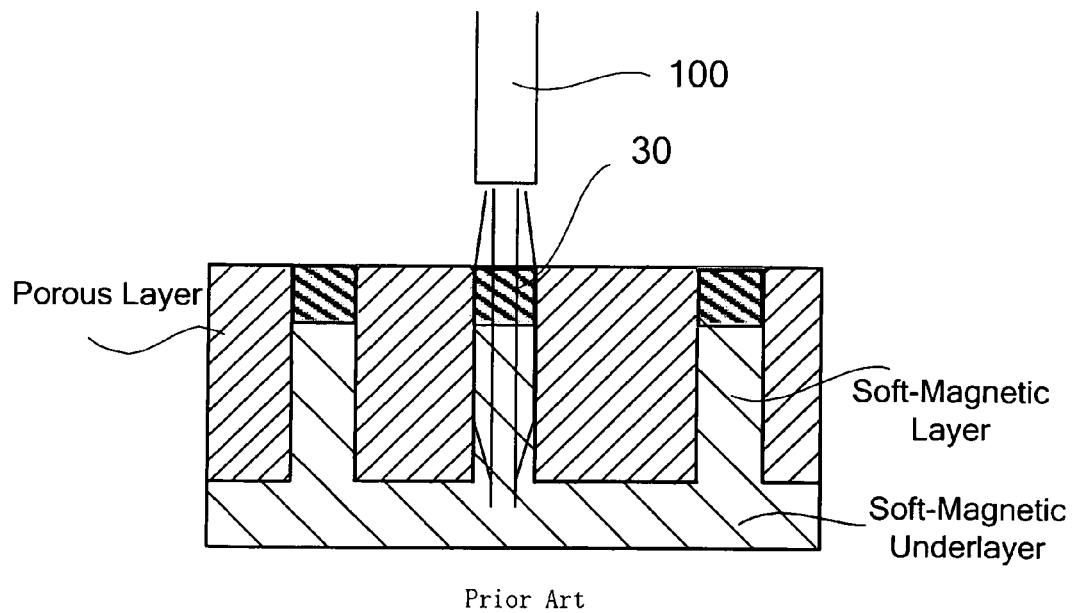
FIG. 4 exemplarily shows a partially cross-sectional view that explains a magnetic recording onto a magnetic recording medium by means of a perpendicular recording system and a single magnetic-pole head.

In the magnetic recording device or the magnetic recording method, the magnetic recording medium according to the present invention is employed. Thus, the distance between the perpendicular magnetic recording head and the soft-magnetic layer in the magnetic recording medium is shorter than the total thickness of the first insulating layer and the second insulating layer, and is substantially equal to the thickness of the ferromagnetic layer; accordingly, the convergence of a magnetic flux from the perpendicular magnetic recording head and the optimum properties for magnetic recording and reproduction at a recording density in practice can be controlled only by controlling the thickness of the ferromagnetic layer, regardless of the thickness of the insulating layers. As shown in FIG. 2B, the magnetic flux from a main pole 100 of the perpendicular magnetic recording head or read-write head converges to the ferromagnetic layer or perpendicularly magnetized film 30. As a result, the magnetic recording device exhibits significantly increased write efficiency, decreased write current, and remarkably improved overwrite properties, as compared with conventional equivalents.

Preferably, the magnetic recording medium further comprises the soft-magnetic underlayer for higher recording density, because the perpendicular magnetic recording head and the soft-magnetic underlayer constitute a magnetic circuit in the construction. The construction may advantageously make possible high-density recording.

In the magnetic recording by means of the magnetic recording device or the magnetic recording method according to the present invention, the magnetic flux from the perpendicular magnetic recording head is free from divergence and tends to converge on the ferromagnetic layer in the magnetic recording medium even at the bottom thereof, i.e., at the interface with the soft-magnetic layer or the nonmagnetic layer, therefore, information can be recorded in small bits.

The degree of convergence or divergence of the magnetic flux may be properly selected in the ferromagnetic layer depending on the application unless significant adverse effects on the present invention.

In the magnetic recording by use of the magnetic recording devices according to the present invention or in the magnetic recording by way of the magnetic recording methods according to the present invention, preferably, the tracking is carried out while adjusting the position of magnetic heads for perpendicular recording such that the magnetic heads for perpendicular recording can trace the center of tracks correctly.

The method of tracking may be properly selected depending on the application. Preferably, the tracking is carried out by detecting frequency-intensity change or signal-phase change caused by the difference between alternately disposed one regular alignment and another regular alignment within plural alignments of nanoholes into which the magnetic material is inserted.

Figure 11A:
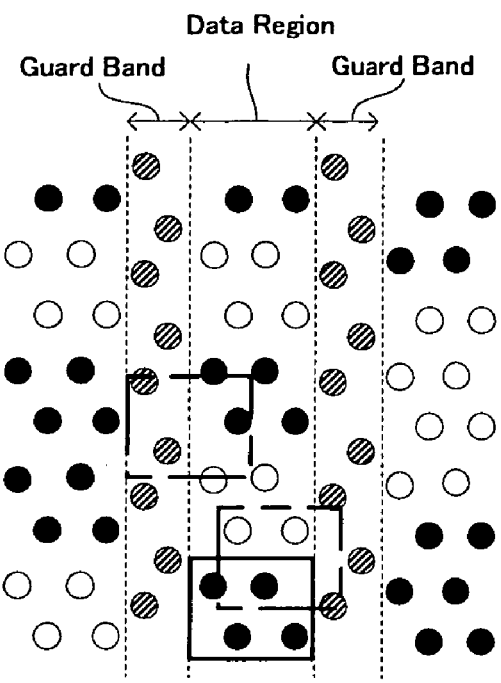
FIG. 11A is a schematic view that exemplarily explains a tracking method by detecting the frequency-intensity changes in a magnetic recording method according to the present invention.
Figure 11B:
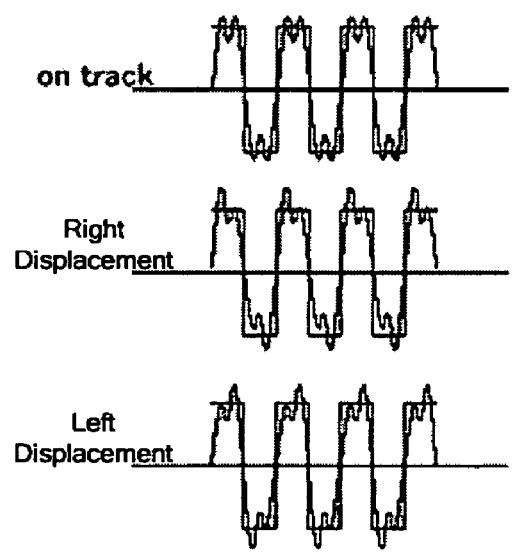
FIG. 11B is a schematic view that exemplarily explains the frequency-intensity changes in on-track and off-track conditions.

The method for tracking by way of detecting the frequency-intensity change will be exemplarily explained. As shown in FIG. 11A, one regular alignment is defined as a data region and the adjacent regular alignment is defined as the guard band region within the plural regular alignment of nanoholes, wherein guard band region:data region=1:2 in FIG. 7A. When a magnetic head traces on the data region, the frequency intensity is constant as shown in FIG. 11B; however, when the magnetic head traces on the guard band region due to displacement of the magnetic head toward right or left, the frequency intensity cause a change due to a phase deviation since the regular alignments are different between the data region and the guard band region, which bring about the phase deviation as shown in FIG. 11B. Accordingly, the magnetic head can undergo the tracking by way of setting a feedback so as to make constant the frequency intensity with time.

Figure 12A:
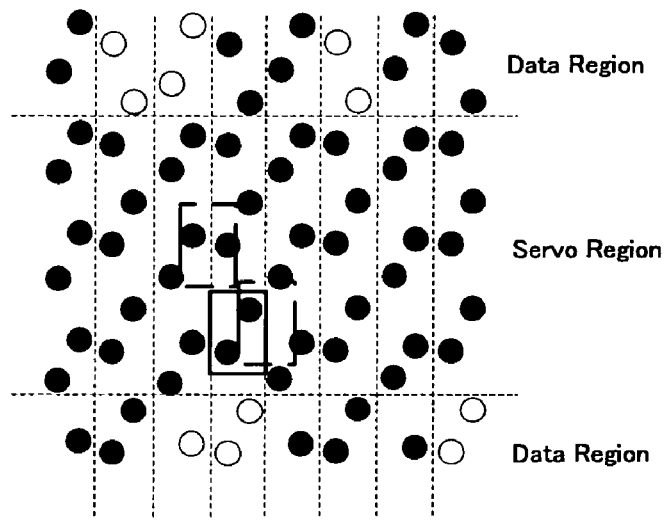
FIG. 12A is a schematic view that exemplarily explains a tracking method by detecting the signal-phase changes in a magnetic recording method according to the present invention.
Figure 12B:
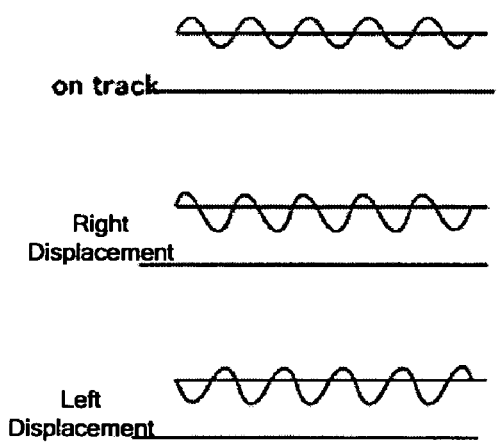
FIG. 12B is a schematic view that exemplarily explains the signal-phase changes in on-track and off-track conditions.

The method for tracking by way of detecting the signal-phase change will be exemplarily explained. About several tens of servo regions are provided radially from the center of the disc substrate as shown in FIG. 8A with a certain space. In the case that the servo regions are that a servo signal is previously recorded within a certain area in a direction within the plural regular alignments of nanoholes as shown in FIG. 12A, and any one track within plural tracks is selected within the servo regions; then a magnetic head traces on the data region, the signal phase is constant as shown in FIG. 12B; however, when the magnetic head traces on adjacent other track due to displacement of the magnetic head toward right or left, the frequency intensity cause a change due to a phase deviation since the regular alignments are different between one track and another track, which bring about the phase deviation as shown in FIG. 12B. Accordingly, the magnetic head can undergo the tracking by way of setting a feedback so as to make constant the signal phase with time.

The present invention can solve the problems in the prior art, namely the present invention can provide nanohole structures that are adapted to wide variety of products in various fields such as magnetic recording media, DNA chips, and catalyst carriers, and methods for economically and efficiently producing the nanohole structures; stampers properly utilized to produce the nanohole structures and capable of producing the nanohole structures efficiently, and methods for producing the stampers; magnetic recording media adapted to hard disks utilized in various products such as external memory devices of computers and recording devices of public videos, capable of easy tracking, and allowing high-density recording, high-speed recording, and higher capacity, and methods economically and efficiently for producing the magnetic recording media; and magnetic recording devices and a magnetic recording methods that utilize the magnetic recording media in perpendicular recording manner.

More specifically, the nanohole structures according to the present invention can be applied appropriately to wide variety of products in various fields such as magnetic recording media, DNA chips, diagnosis devices, detection sensors, catalyst carriers, field-emission displays, in particular appropriately to hard disk devices utilized, for example, for external memory devices of computers and recording devices of public videos.

The methods for producing a nanohole structure according to the present invention can be appropriately applied to for producing the nanohole structures according to the present invention.

The stampers according to the present invention can be appropriately utilized for producing the nanohole structures according to the present invention, thereby the nanohole structures according to the present invention can be effectively produced.

The magnetic recording media according to the present invention can be appropriately utilized for hard disks utilized in various products such as external memory devices of computers and recording devices of public videos.

The methods for producing a magnetic recording medium according to the present invention can be appropriately applied to the production of the magnetic recording media according to the present invention.

The magnetic recording devices according to the present invention can be appropriately utilized for hard disks utilized in various products such as external memory devices of computers and recording devices of public videos.

The magnetic recording methods according to the present invention can be appropriately applied to high-quality recording which affords easy tracking, provides high-density recording and high-speed recording with higher capacity without increasing write current at magnetic heads, and represents excellent overwrite property.

The present invention will be explained more specifically with reference to examples, but these are not to be construed as limiting the present invention. In the examples given below, a magnetic recording medium according to the present invention, which comprising a nanohole structure according to the present invention, was produced by a method for producing a magnetic recording medium according to the present invention, the magnetic recording medium was subjected to magnetic recording by a magnetic recording device according to the present invention, then a magnetic recording method according to the present invention was conducted.

EXAMPLE 1

—Preparation of Nanohole Structure—

As shown in FIG. 8A, convexoconcave pattern 410 was formed by concentrically drawing lines on a resist layer of 40 nm thick spin-coated on glass support 400, using an electron beam exposure device of model r-θ. In the convexoconcave pattern 410, the width of the concave portions 420 was 150 nm, the width of the convex portions 430 was 90 nm, and the height of the convex portions 430 was 30 nm.

Figure 8B:
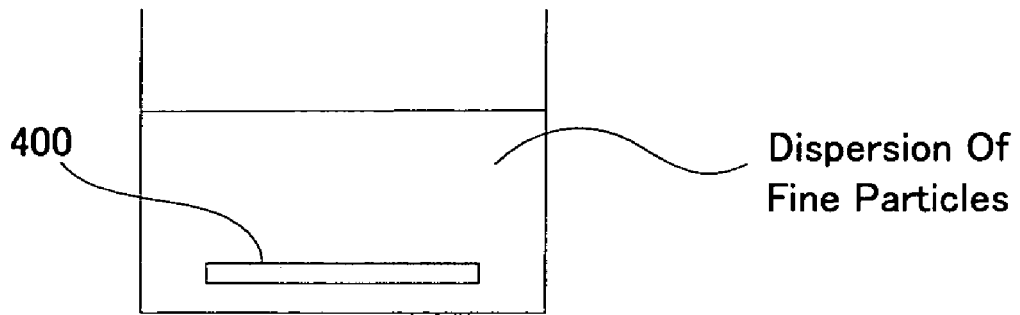
FIG. 8B is a schematic view that exemplarily explains a step for arranging fine particles into a monolayer on a support.
Figure 8C:
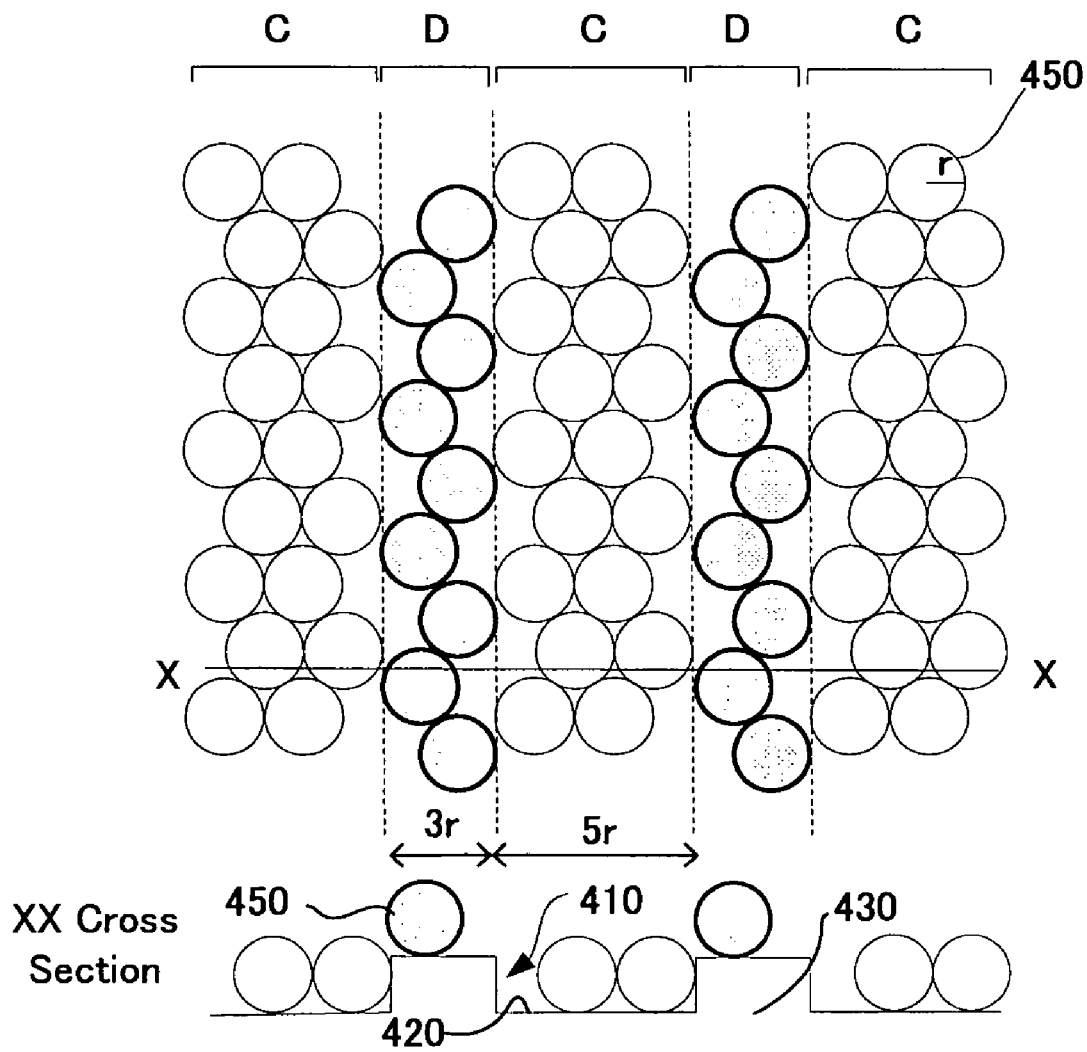
FIG. 8C is a schematic view that exemplarily explains an alignment of fine particles that are arranged into a monolayer on convexoconcave lines.

Next, as shown in FIG. 8B, glass support 400 was immersed into a vessel containing a dispersion of fine particles having an average particle diameter of 60 nm, and the dispersion was subjected to centrifugation, thereby fine particles 450 were arranged into a monolayer on the surface of glass support 400 as shown in FIG. 8C.

Consequently, the fine particles 450 were arranged into regular alignments of hexagonal closest packing, the regular alignment C and the regular alignment D at adjacent concave portions 420 and convex portions 430 were different each other.

Next, an optical-curable polymer was coated over the fine particles 450 arranged into a monolayer configuration along convexoconcave lines 410 on the glass support 400 as shown in FIG. 9A, thereby optical-curable polymer layer 460 was formed into 200 nm thick as shown in FIG. 9B. Then a transparent glass plate (not shown) was disposed on the optical-curable polymer layer 460, then UV-rays were irradiated onto the optical-curable polymer layer through the transparent glass plate by use of Deep UV irradiating device (wavelength: 257 nm), then the glass support 400 was peeled away.

As a result, the pattern of the regularly aligned fine particles 450 was transferred to the cured polymer layer 460 as shown in FIG. 9C, thereby regularly arranged concave portions 500 were formed in a pattern capable of engaging with the spherical portions of the fine particles 450.

Figure 9E:
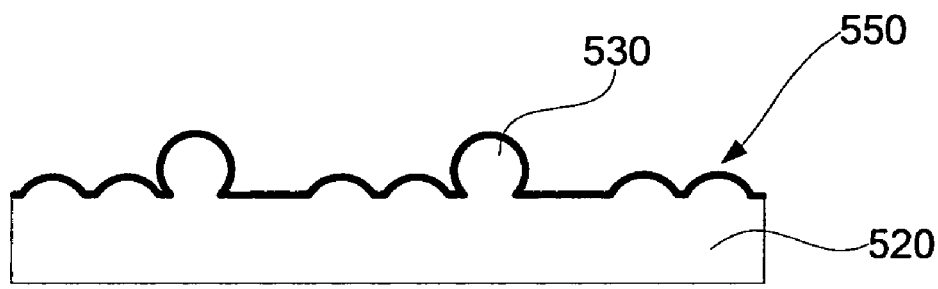
FIG. 9E is a schematic view that exemplarily shows the fifth step for producing a stamper utilized for producing a nanohole structure according to the present invention.

Next, as shown in FIG. 9D, Cr 510 was deposited for an electrode to a thickness of 20 nm onto the surface of the optical-curable polymer layer 460 where the shape of fine particles 450 was transferred and concave portions were formed, and Ni was plated to a thickness of 300 nm using the vapor-deposited Cr as the electrode and a bath of sulfamic acid thereby to form Ni plating 520. The concentration of sulfamic acid in the bath was 600 g/L, the pH was 4.0; the current density was 2 A/dm$^2$. After the plating, the cured optical-curable polymer layer 460 was peeled away. Consequently, Ni stamper 550 was obtained that had spherical convex portions 530 corresponding to the pattern of the aligned fine particles 450 as shown in FIG. 9E. As for the configuration of the resultant Ni stamper 550, the diameter and the height of convex portions 530 were 60 nm and 40 nm respectively. The plural regular alignments of convex portions 530 were disposed adjacently and alternately, and the regular alignments were different between adjacent alignments. These procedures correspond to the step for forming a stamper in the method for producing a nanohole structure according to the present invention, and also to the method for producing a stamper according to the present invention. The resultant stamper corresponds to the stamper according to the present invention.

Next, a soft-magnetic underlayer (not shown) was formed on the smooth substrate 600 for magnetic disks by way of spattering processes, and aluminum film 610 was formed as shown in FIG. 10A, then the resultant Ni stamper 550 was pressed onto the aluminum film 610, thereby the pattern of aligned fine particles 450 in regular alignments was imprint-transferred onto the surface of the aluminum film 610 to form the origins for forming nanoholes. The pressure at the imprint-transfer was 4,000 N/cm$^2$ (4 ton/cm$^2$).

Figure 10B:
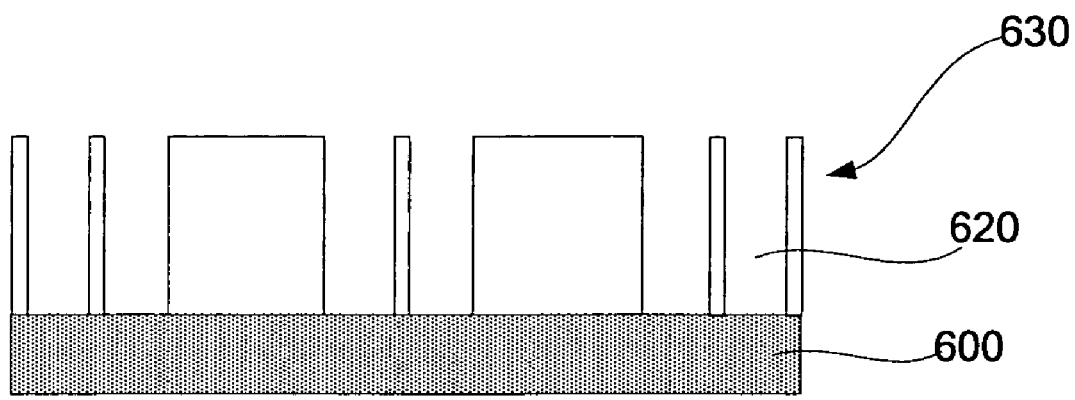
FIG. 10B is a schematic view that exemplarily shows the second step for forming nanoholes in the method for producing a nanohole structure according to the present invention.
Figure 10C:
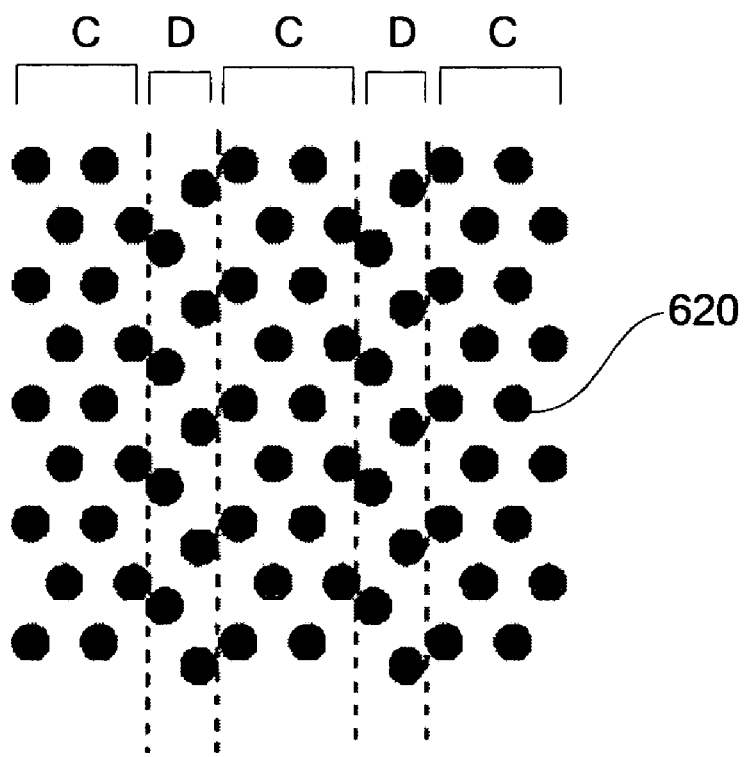
FIG. 10C is a schematic view that exemplarily shows an alignment of nanoholes on a surface of nanohole structure according to the present invention.

Then the aluminum film 610 was subjected to anodization by use of a bath of diluted sulfuric acid as shown in FIG. 10B. The voltage in the anodization was 25 V. As a result, porous layer 630 of alumite pores was formed in which a number of nanoholes 620 of alumite pores were formed in a direction approximately perpendicular to the glass substrate 600. The porous layer 630, which corresponded to the nanohole structure according to the present invention, was formed from the plural arrays of nanoholes 620 of alumina pores respectively arranged into regular alignments, the regular alignments were different between adjacent arrays, and the regular alignments of C and D were disposed alternately as shown in FIG. 10C. These procedures correspond to the step for forming nanoholes in the method for producing a nanohole structure according to the present invention.

EXAMPLE 2

A nanohole structure according to the present invention was applied to a magnetic recording medium of magnetic disk, and the magnetic recording medium was produced and evaluated as to the properties as follows.

—Step for Forming Soft-Magnetic Underlayer—

The step for forming the soft-magnetic underlayer described above was carried out by way of forming or laminating FeCoNiB of the soft-magnetic underlayer to 500 nm thick by an electroless plating process.

—Step for Forming Nanohole Structure or Porous Layer—

The step for forming a nanohole structure was carried out as follows. Nb and Al were laminated to 5 nm and 200 nm respectively on the soft-magnetic underlayer by a spattering process. Three laminated substrates of this configuration were prepared by the same way, and the pattern of aligned fine particles was imprint-transferred to the aluminum layer by use of the Ni stamper obtained in Example 1 having convex portions of 60 nm diameter and 40 nm height.

Next, the imprint-transferred sample was subjected to anodization in a sulfuric acid solution of concentration 0.3 mole/L and bath temperature 16° C. at a voltage of 25 V, thereby nanoholes of alumina pores were formed. After the anodization, the samples were immersed into a phosphoric acid solution of concentration 5% by mass and bath temperature 30° C., thereby the aperture size of the nanoholes of alumina pores was enlarged and the aspect ratio was adjusted. By these procedures, the nanohole structure was formed.

—Step for Inserting Magnetic Material—

Electrodeposition was performed within the nanoholes using a plating bath containing copper sulfate of 5% by mass and boric acid of 2% by mass at bath temperature 35° C., thereby Co of ferromagnetic material was inserted within the nanoholes and a ferromagnetic layer was formed within the nanoholes to produce a magnetic disk.

—Polishing Process—

The polishing process was carried out in the following manner. The surface of the magnetic disk was polished using lapping tapes in order to float the magnetic head. More specifically, the alumina in convex portions exposed from the openings of the nanoholes was roughly polished using an alumina tape having a particle size of 3 μm and was finish-polished using an alumina tape having a particle size of 0.3 μm. The porous layer of alumina had a thickness of about 150 nm after the polishing process and the nanoholes inserted with the cobalt (Co) had an aspect ratio of about 2.5.

Next, a lubricant of perfluoropolyether (AM3001, by Solvay Solexis Co.) was coated to the polished surface of the magnetic disk by dipping to thereby form magnetic disk sample A for evaluating properties.

The magnetic disk sample B for comparison was prepared by the similar procedures without imprint-transferring by the stamper.

Figure 13:
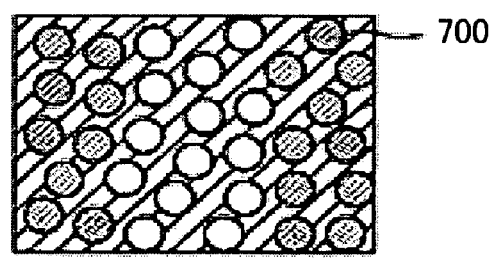
FIG. 13 is a schematic view that exemplarily shows a magnetic recording medium where a magnetic metal is inserted into anodized alumina pores arranged two-dimensionally.

In magnetic disk sample B, the nanoholes of alumina pores 700 were arranged two-dimensionally in the form of hexagonal closest packing as shown in FIG. 13, i.e. the regular alignments were not alternately disposed.

The tracking properties of magnetic disk samples A and B were evaluated by using a merge-type magnetic head described below comprising a monopole write head for perpendicular recording and a GMR read head. The head parameters are as follows.

Write Core Width: 60 nm
Write Pole Length: 50 nm
Read Core Width: 50 nm
Read Gap Length: 60 nm Initially, magnetic disk samples A and B were magnetized in a direction perpendicular to the substrate plane using a permanent magnet. Then, signal intensities were evaluated while rotating the magnetic disk samples A and B, floating the magnetic head, and leading to off-track in a reading condition.

Figure 14A:
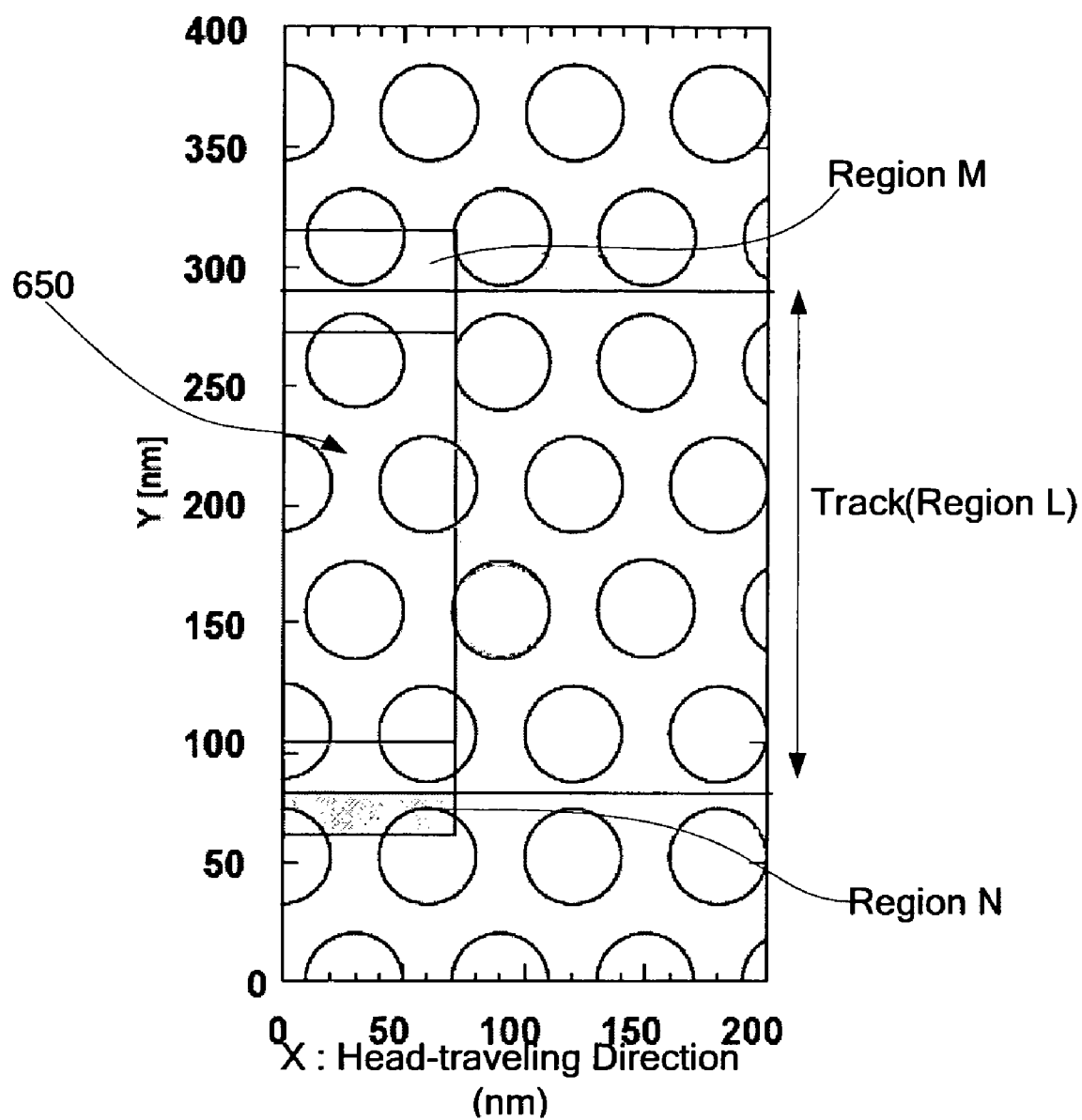
FIG. 14A is a schematic view that exemplarily explains a relation between an alignment of magnetic material and a detection region of a magnetic head in magnetic sample disk A.
Figure 14B:
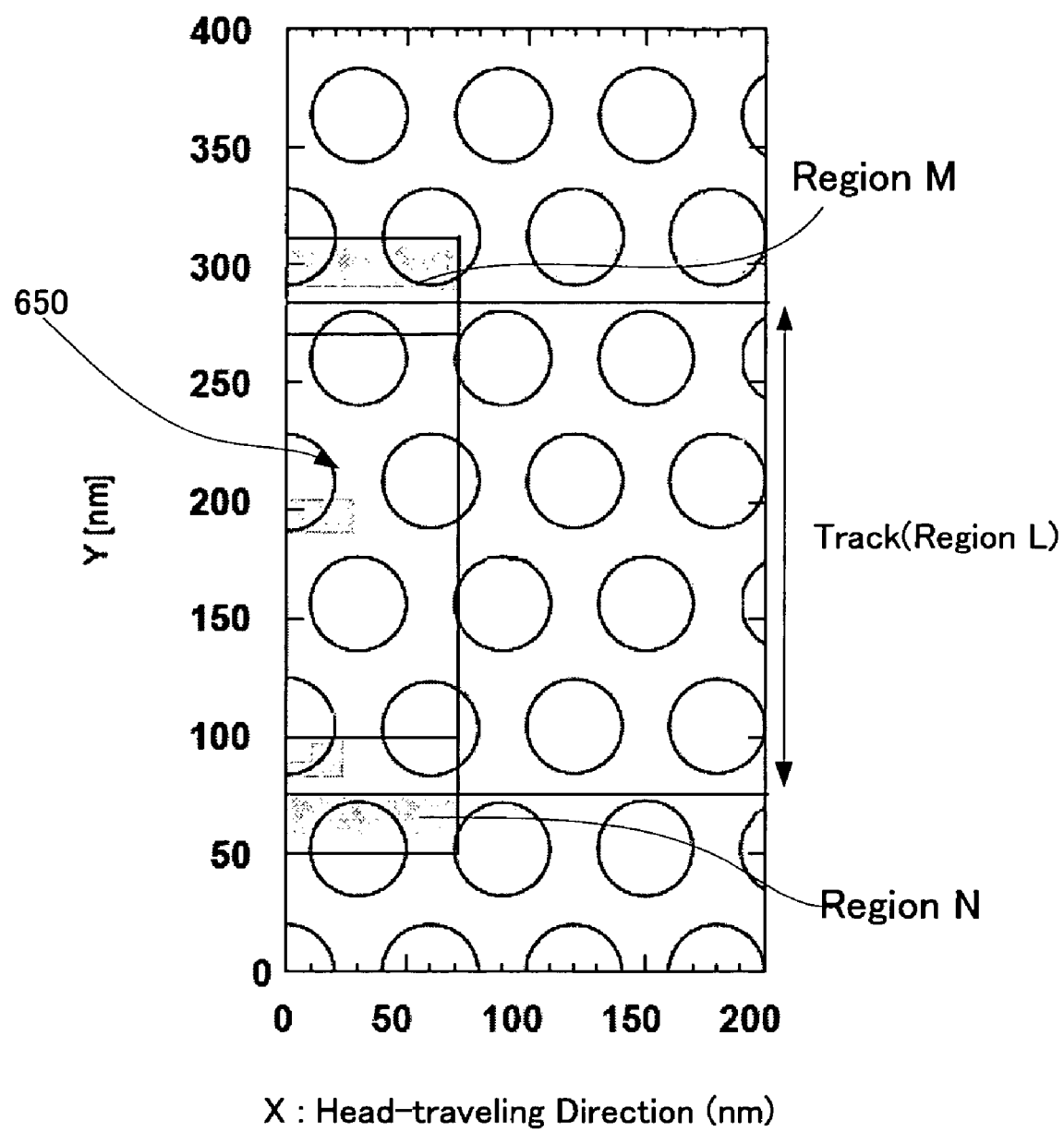
FIG. 14B is a schematic view that exemplarily explains a relation between an alignment of magnetic material and a detection regions of a magnetic head in magnetic sample disk B.

FIG. 14A shows the configuration of magnetic material, i.e. nanoholes into which the magnetic material was inserted, in magnetic disk sample A; FIG. 14B shows the configuration of magnetic material in magnetic disk sample B. In FIGS. 14A and 14B, the dot size of the magnetic material was 20 nm in radius, the dot pitch was 60 nm, and the size of area where magnetic head 650 detected was 70×210 nm$^2$. One bit of recording was regenerated by about five dots of magnetic material at once.

The traveling direction of the magnetic head 650 was defined as the direction of X-axis. While the magnetic head was traveled along the X-axis direction, the magnetic head was shifted from on-track condition (region L in FIGS. 14A and 14B) to off-track conditions, i.e. to the plus region deviated at a distance of 50% of dot pitch (region M in FIGS. 14A and 14B) and to the minus region deviated at a distance of 50% of dot pitch (region N in FIGS. 14A and 14B), and signal intensities at X sites were measured. The results are shown in FIG. 15A in terms of magnetic disk sample A and in FIG. 15B in terms of magnetic disk sample B.

Figure 15A:
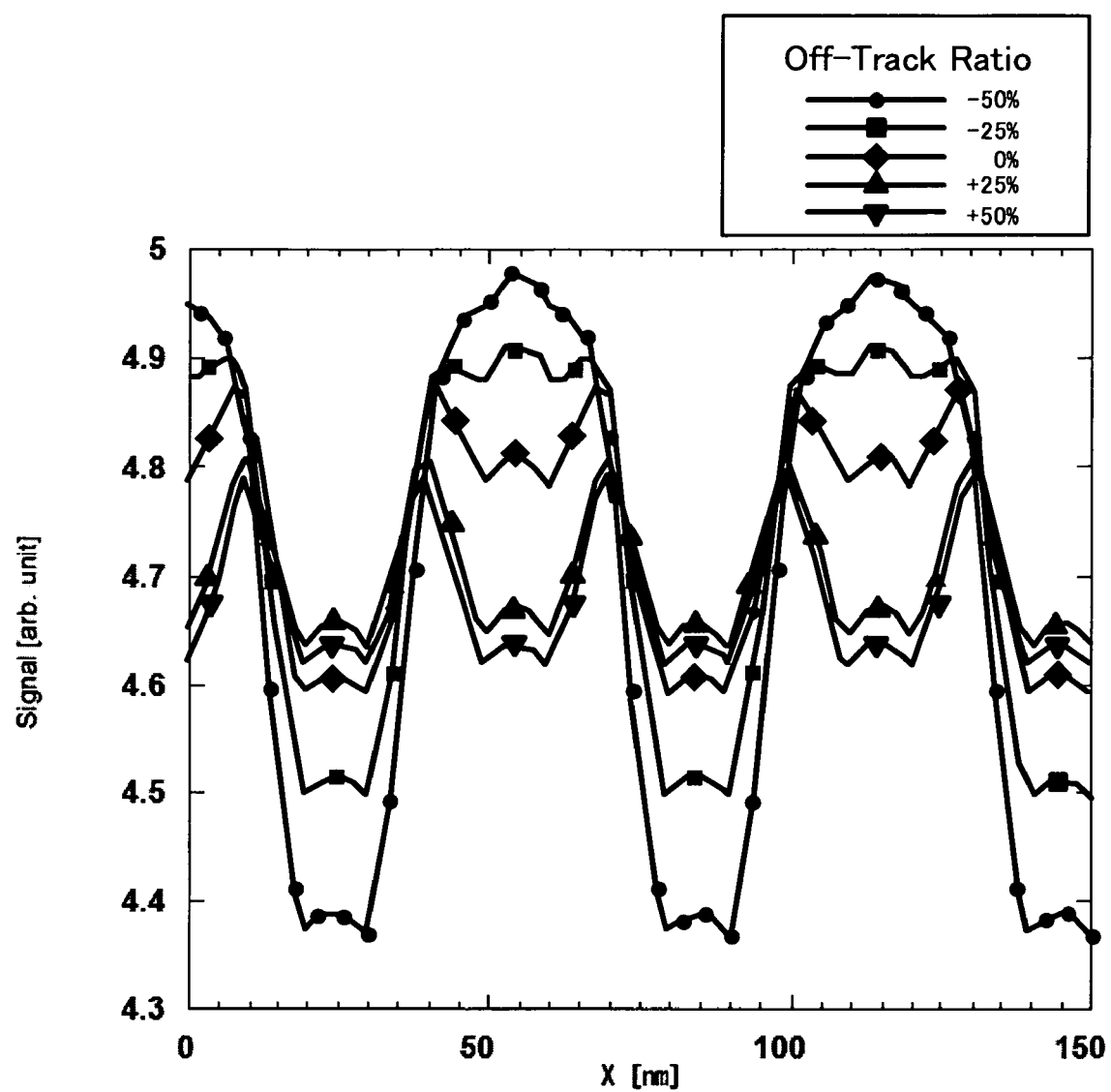
FIG. 15A is a schematic graph that exemplarily shows the signal-intensity changes in magnetic sample disk A.
Figure 15B:
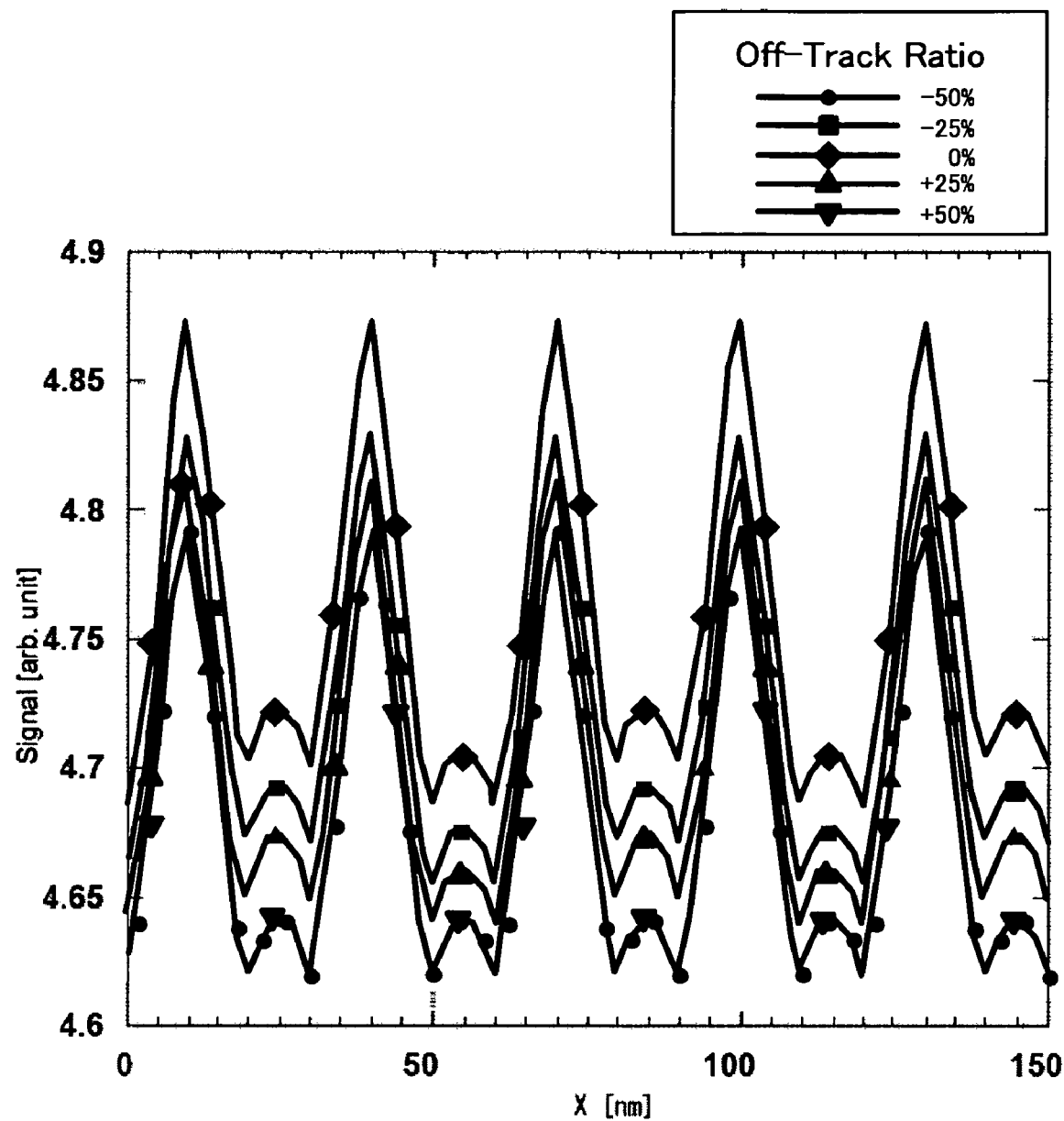
FIG. 15B is a schematic graph that exemplarily shows the signal-intensity changes in magnetic sample disk B.

The results shown in FIG. 15A demonstrate that the magnitude of signal intensities varies depending on the sift or off-track direction of magnetic head 650 in magnetic disk sample A, and the shift direction can be detected at the same time, thus the tracking can be easily performed based on the shift direction of the magnetic head 650. On the other hand, the results shown in FIG. 15B demonstrate that the signal intensities decrease merely in both cases of plus and minus shift directions of the magnetic head, and FIG. 15B is approximately the same as that of on-track conditions versus X-axis, thus the shift direction of the magnetic head cannot be detected.

Figure 16:
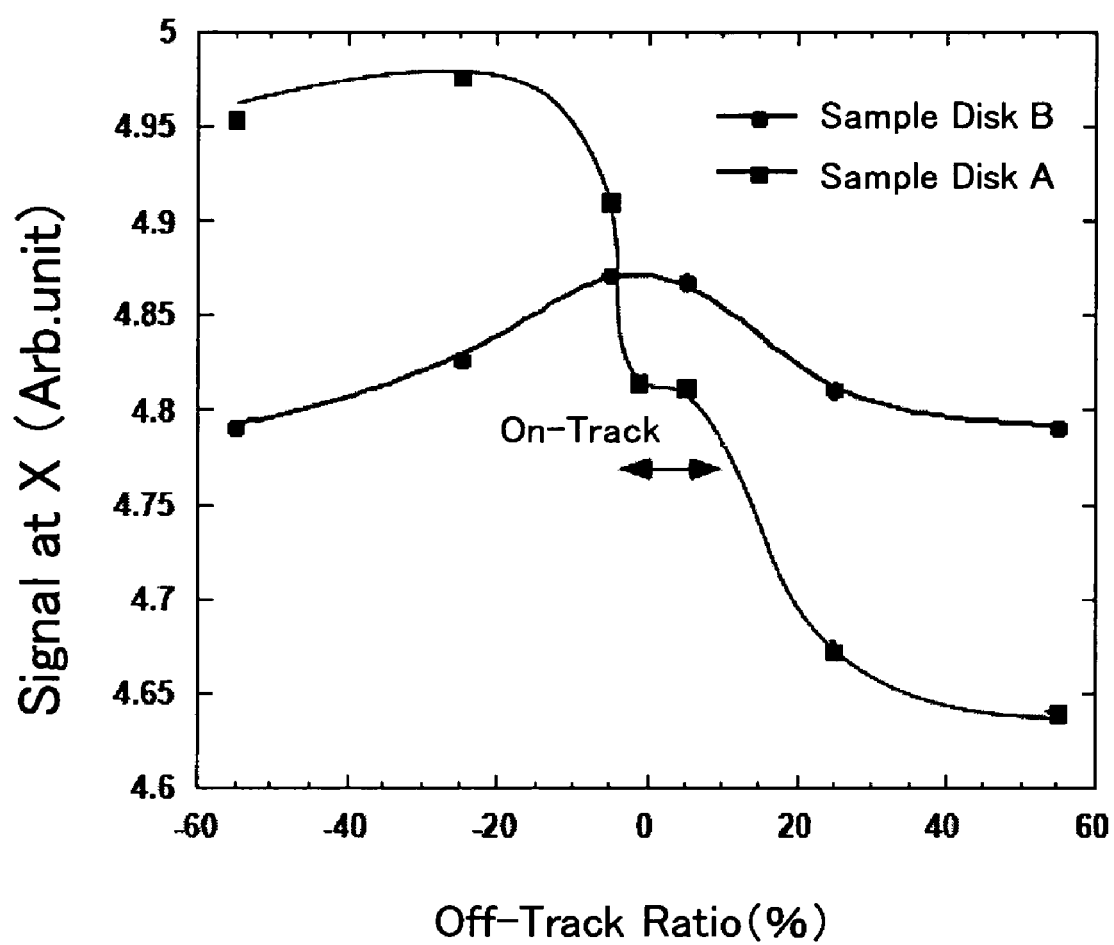
FIG. 16 is a schematic graph that exemplarily shows the relation between off-track ratio of a magnetic head and signal intensity.
Figure 17:
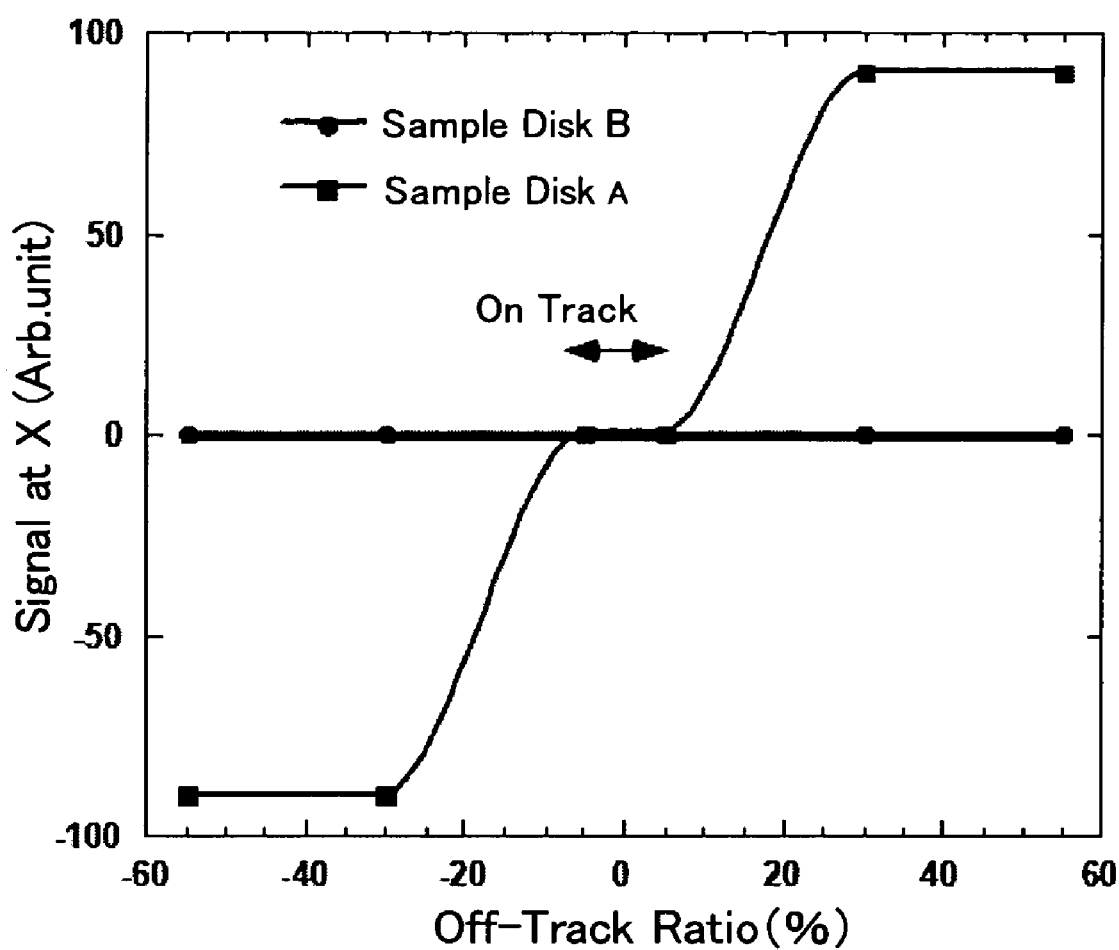
FIG. 17 is a schematic graph that exemplarily shows the relation between off-track ratio of a magnetic head and peak phase of signal intensity.

FIG. 16 shows changes of signal intensity versus off-track ratio of the magnetic head 650, and FIG. 17 shows phase changes at peak sites of signal intensity. FIGS. 16 and 17 demonstrate that the magnitudes of signal intensity change and phase change alter depending on the shift or off-track direction of the magnetic head 650, thus the shift direction of the magnetic head 650 can also be detected.

Figure 18A:
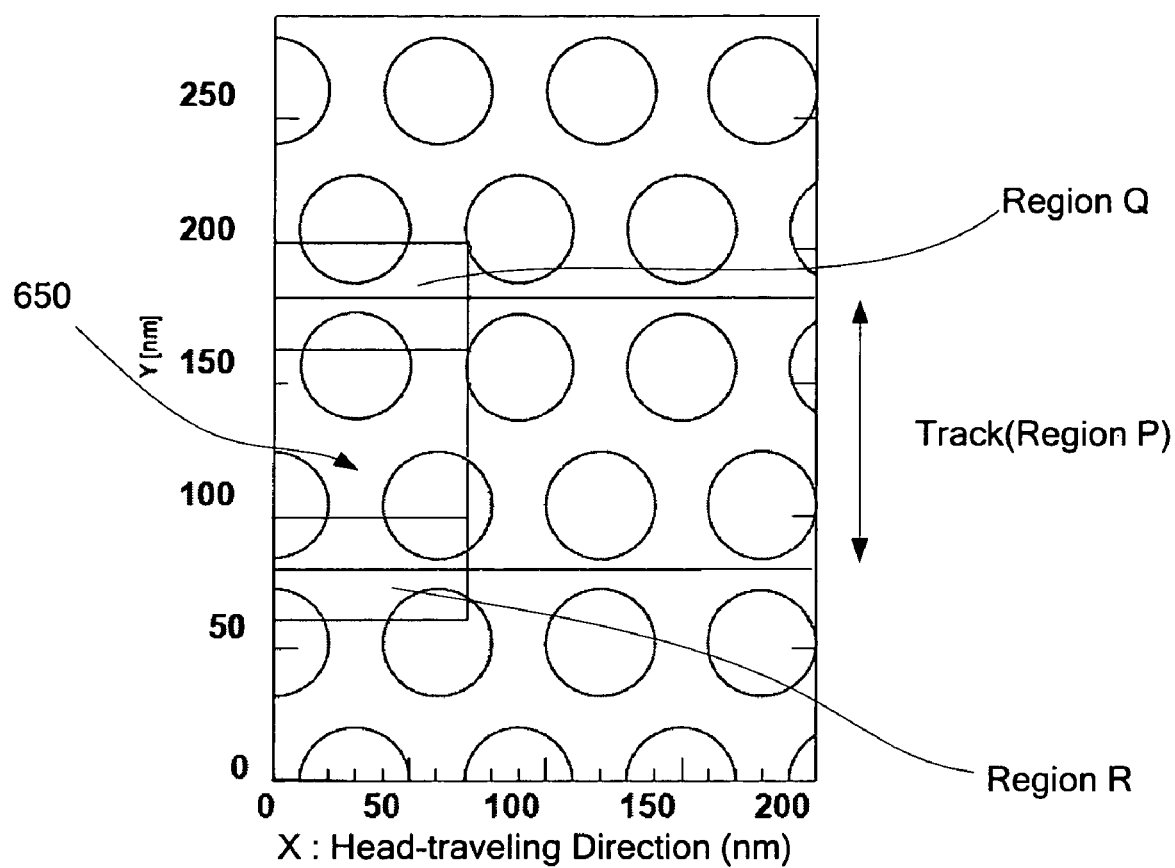
FIG. 18A is a schematic view that exemplarily explains another relation between an alignment of magnetic material and a detection region of a magnetic head in magnetic sample disk A.
Figure 18B:
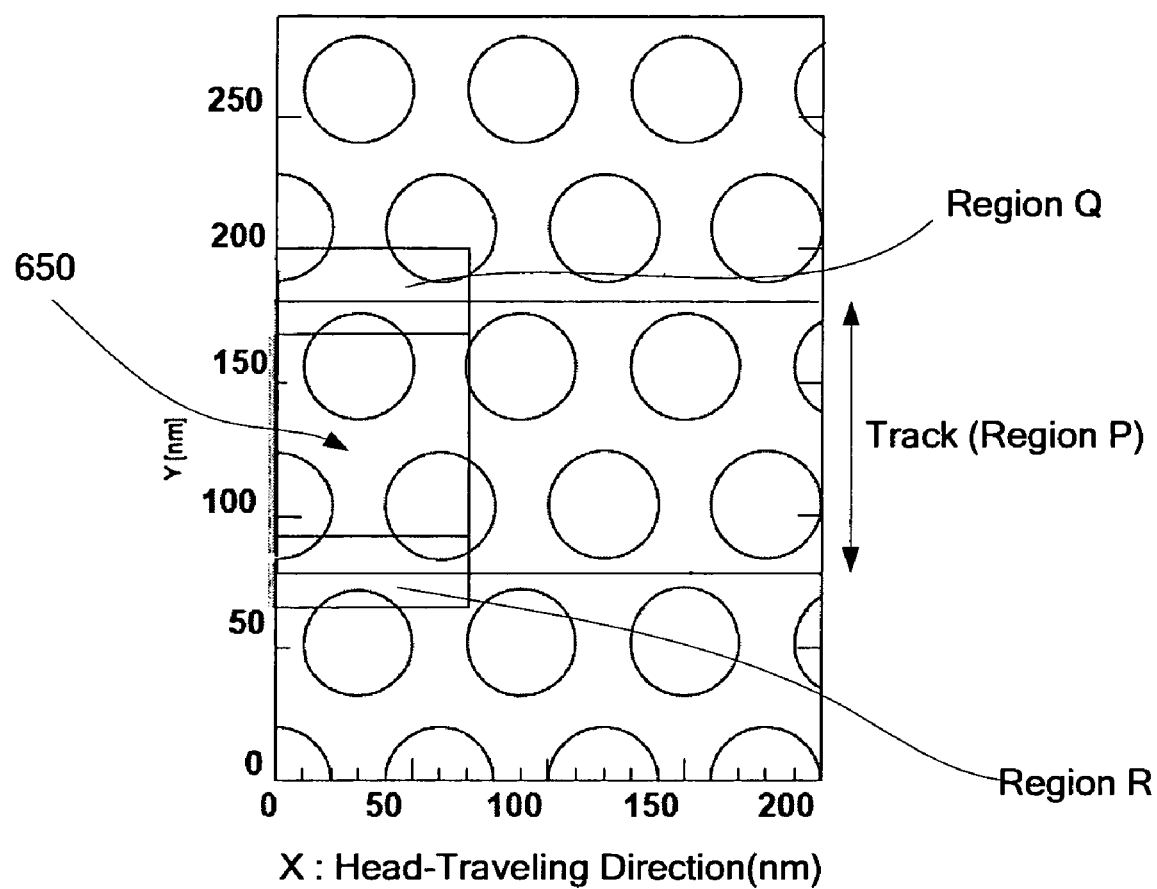
FIG. 18B is a schematic view that exemplarily explains another relation between an alignment of magnetic material and a detection region of a magnetic head in magnetic sample disk B.

FIG. 18A shows the arrangement of magnetic material, i.e. nanoholes inserted with the magnetic material, of magnetic disk sample A; FIG. 18B shows the arrangement of magnetic material of magnetic disk sample B, wherein one bit of recording was regenerated by about two dots of magnetic material at once. The dot size of the magnetic material was 20 nm in radius, the dot pitch was 60 nm, and the size of area where magnetic head 650 detects was 70×100 $nm^2$.

The traveling direction of the magnetic head 650 was defined as the direction of X-axis. While the magnetic head 650 was traveled along the X-axis direction, the magnetic head was shifted from on-track condition (region P in FIGS. 18A and 18B) to off-track condition, i.e. to the plus region deviated at a distance of 35% of dot pitch (region Q in FIGS. 18A and 18B) and to the minus region deviated at a distance of 35% of dot pitch (region R in FIGS. 18A and 18B). Signal intensities were measured at X sites. The results are shown in FIG. 19A in terms of magnetic disk sample A and in FIG. 19B in terms of magnetic disk sample B.

Figure 19A:
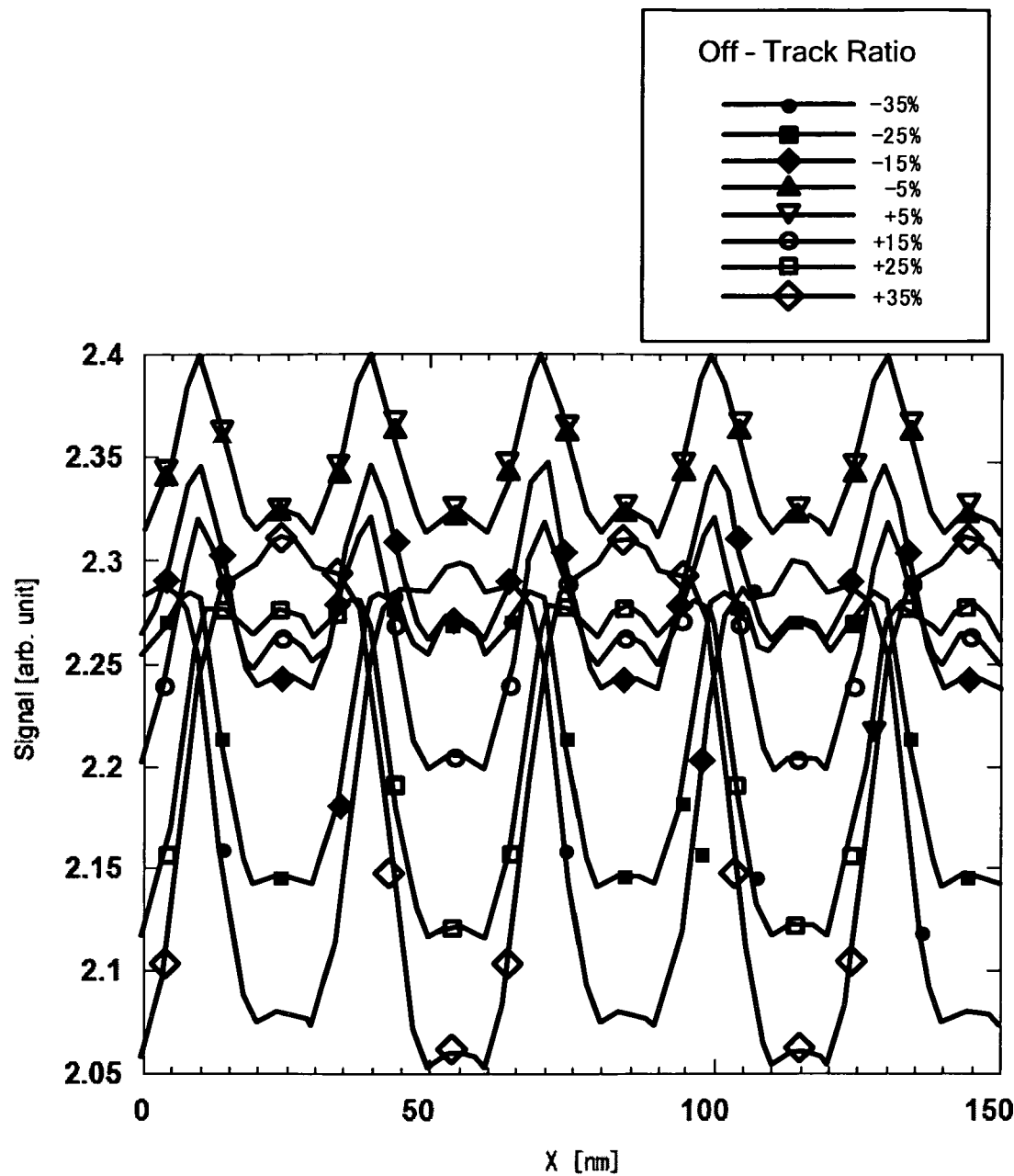
FIG. 19A is a schematic graph that exemplarily shows another signal-intensity changes in magnetic sample disk A.
Figure 19B:
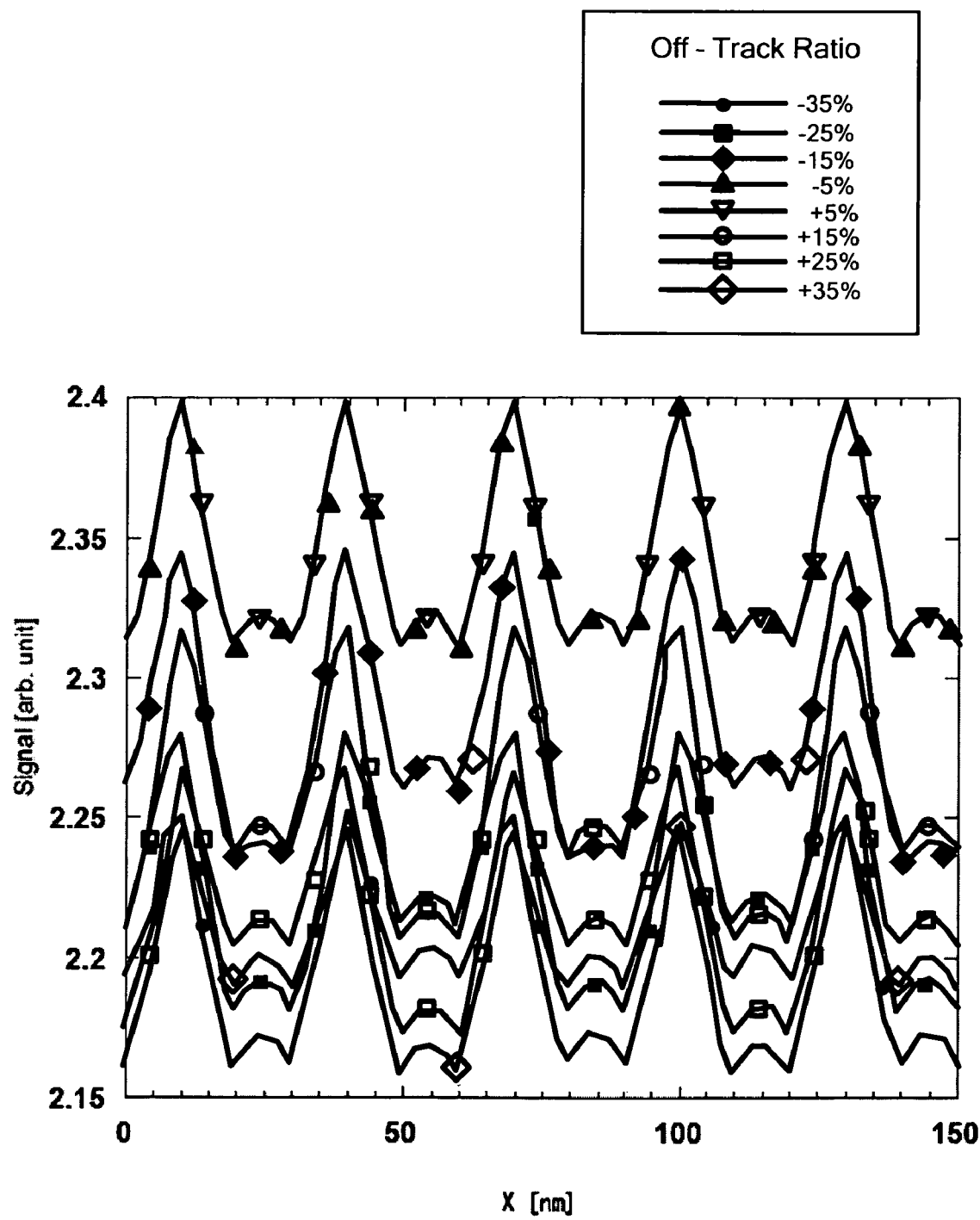
FIG. 19B is a schematic graph that exemplarily shows another signal-intensity changes in magnetic sample disk B.

The results of FIGS. 19A and 19B demonstrate that the magnitude of signal intensities varies depending on the sift or off-track direction of magnetic head 650 in magnetic disk sample A, and the shift direction can be detected at the same time, similarly to the case that one bit of recording is regenerated by about five dots of magnetic material at once, thus the tracking can be easily performed based on the shift direction of the magnetic head 650.

Figure 20:
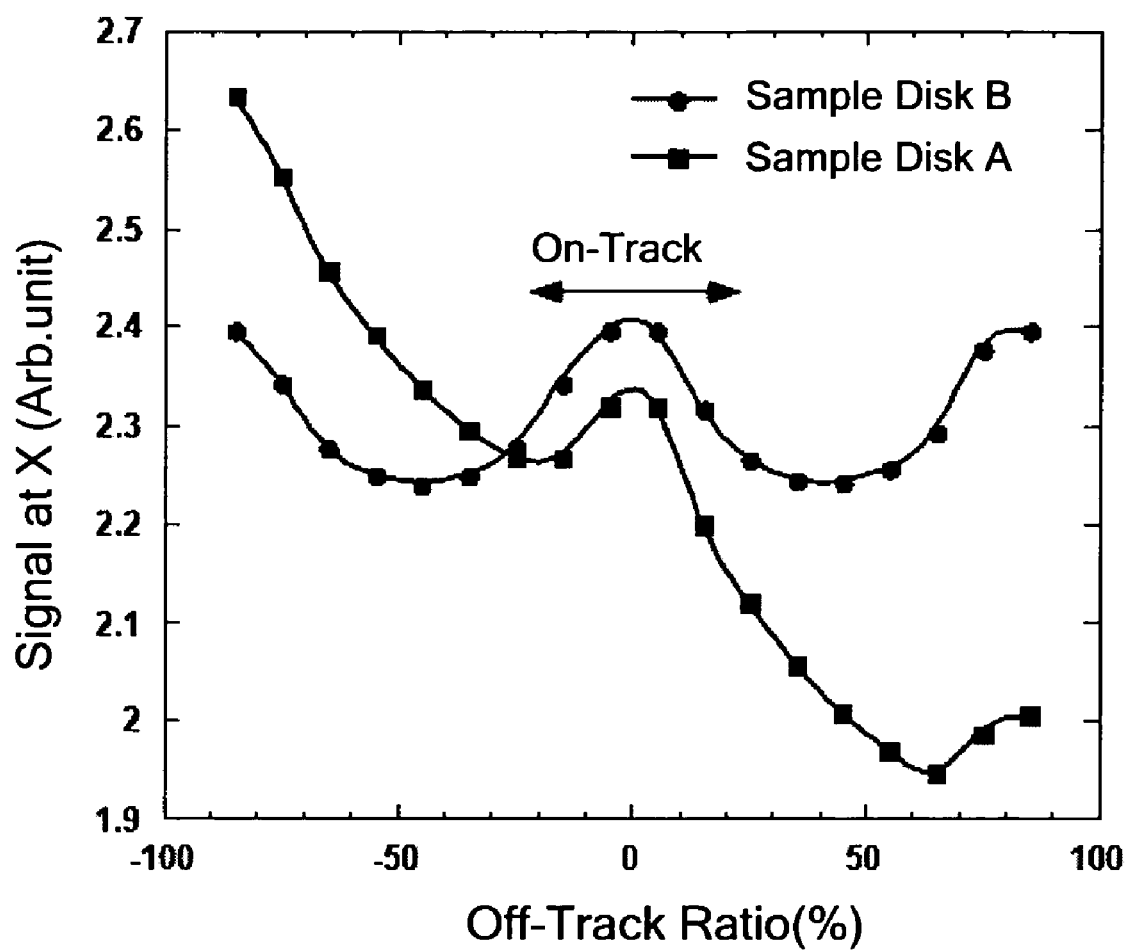
FIG. 20 is a schematic graph that exemplarily shows another relation between off-track ratio of a magnetic head and signal intensity.
Figure 21:
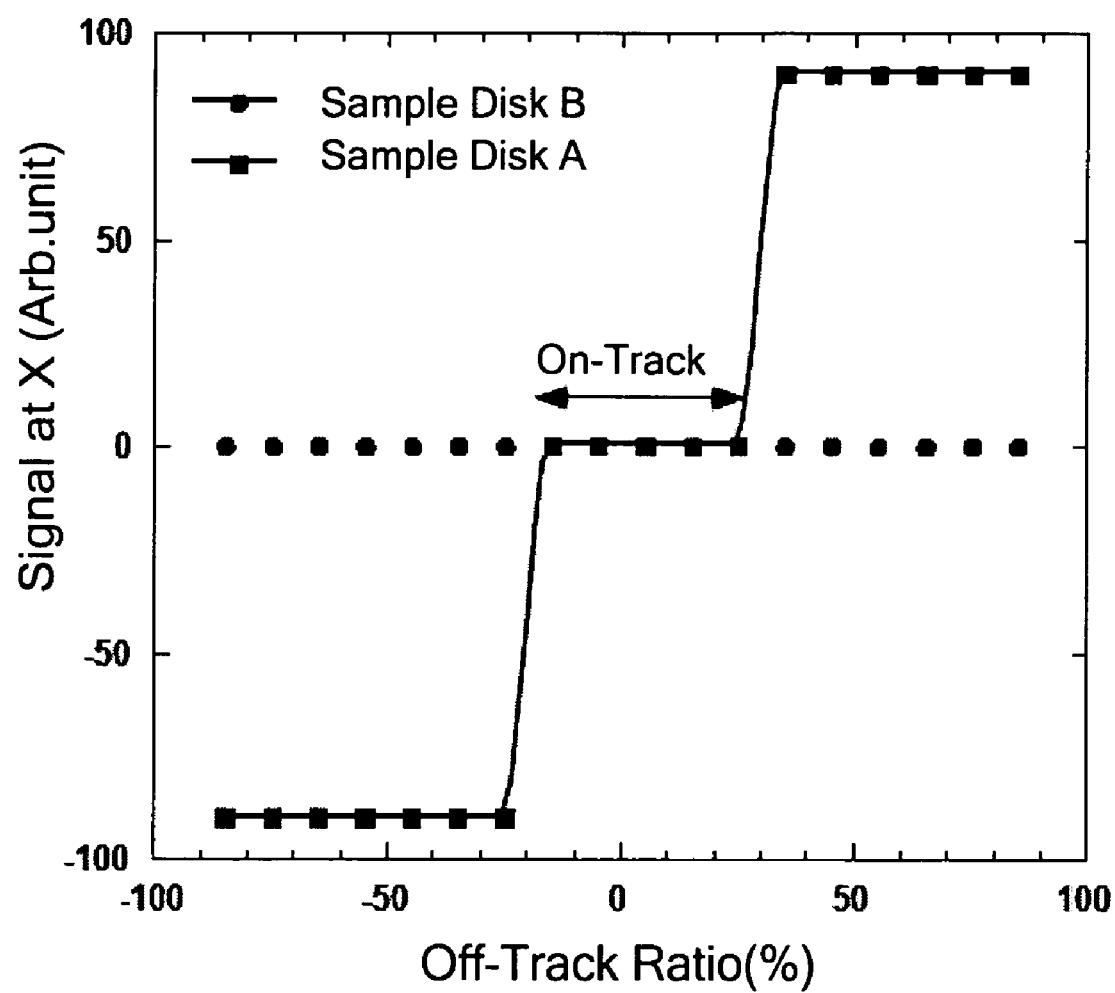
FIG. 21 is a schematic graph that exemplarily shows another relation between off-track ratio of a magnetic head and peak phase of signal intensity.

FIG. 20 shows changes of signal intensity versus off-track ratio of the magnetic head 650, and FIG. 21 shows phase changes at peak sites of signal intensity. FIGS. 20 and 21 demonstrate that the magnitudes of signal intensity changes and phase change alter depending on the shift or off-track direction of the magnetic head 650, similarly to the case that one bit of recording is regenerated by about five dots of magnetic material at once, thus the shift direction of the magnetic head can also be detected.

The specific data such as dot size of magnetic material in Example 2 are no more than examples of magnetic recording media according to the present invention, thus the scaling can be performed even the dot size, magnetic head size, etc. are altered, as long as the proportional relations are maintained.

EXAMPLE 3

A magnetic recording medium according to the present invention was prepared. CoZrNb, which being a material of soft-magnetic underlayer, was formed into a film of 200 nm thick on a silicon substrate by a spattering process. This procedure corresponds to the step for forming a soft-magnetic underlayer in the method for producing a magnetic recording medium according to the present invention.

Next, an aluminum layer was formed on the soft-magnetic underlayer into 500 nm thick by a spattering process using an aluminum target of purity 99.995%. The metal layer of aluminum was subjected to anodization using the soft-magnetic underlayer of CoZrNb as an electrode in the same manner as Example 2, thereby nanoholes or alumina pores were formed into the metal layer of aluminum. The nanoholes or alumina pores had an aperture diameter of 40 nm, an aspect ratio of 12.5, and plural regular alignments that were arranged adjacently and disposed concentrically and alternately.

A barrier layer was present at the bottoms of the alumina pores as the porous layer or nanohole structure, therefore, the barrier layer was eliminated by an etching process using phosphoric acid, thereby the soft-magnetic underlayer of CoZrNb was exposed and through-holes were formed. This procedure corresponds to the step for forming a nanohole structure in the method for producing a magnetic recording medium according to the present invention.

Next, NiFe of soft-magnetic layer was electro-deposited within the nanoholes or alumina pores of the porous layer or nanohole structure, using the soft-magnetic underlayer of CoZrNb as an electrode for minus voltage and a bath containing a solution of nickel sulfate and ferrous sulfate. The composition of the solution of nickel sulfate and ferrous sulfate was a permalloy composition of Ni: 80% and Fe: 20%, and the thickness of the soft-magnetic layer was about 250 nm. This procedure corresponds to the step for forming a soft-magnetic layer in the method for producing a magnetic recording medium according to the present invention.

Then, FeCo of the ferromagnetic layer was electro-deposited on the soft-magnetic layer formed within the fine pores of the porous layer or alimite pores, by exchanging the solution of nickel sulfate and ferrous sulfate into a solution containing FeCo. This procedure corresponds to the step for forming a ferromagnetic layer in the method for producing a magnetic recording medium according to the present invention.

After the surface of the porous layer was polished, $SiO_2$ was formed for a protective film by a spattering process, then varnish/lubricant treatment was performed, consequently, sample disk C of a magnetic recording medium according to the present invention was prepared. The thickness of the ferromagnetic layer in sample disk C was 250 nm.

For comparison, comparative sample disk D was prepared in the same manner as sample disk C, except that the soft-magnetic layer of the sample disk C was not formed, and only the ferromagnetic layer was formed within the nanoholes of the porous layer or nanohole structure, i.e. the ferromagnetic layer was formed into the total thickness of the soft-magnetic and ferromagnetic layers in the sample disk C.

The resultant sample disks C and D were evaluated in terms of the recording and regenerating properties by way of writing by the mono-pole head and reading by the GMR head using a magnetic recording device equipped with the mono-pole head for reading and the GMR head for the magnetic head.

Figure 22:
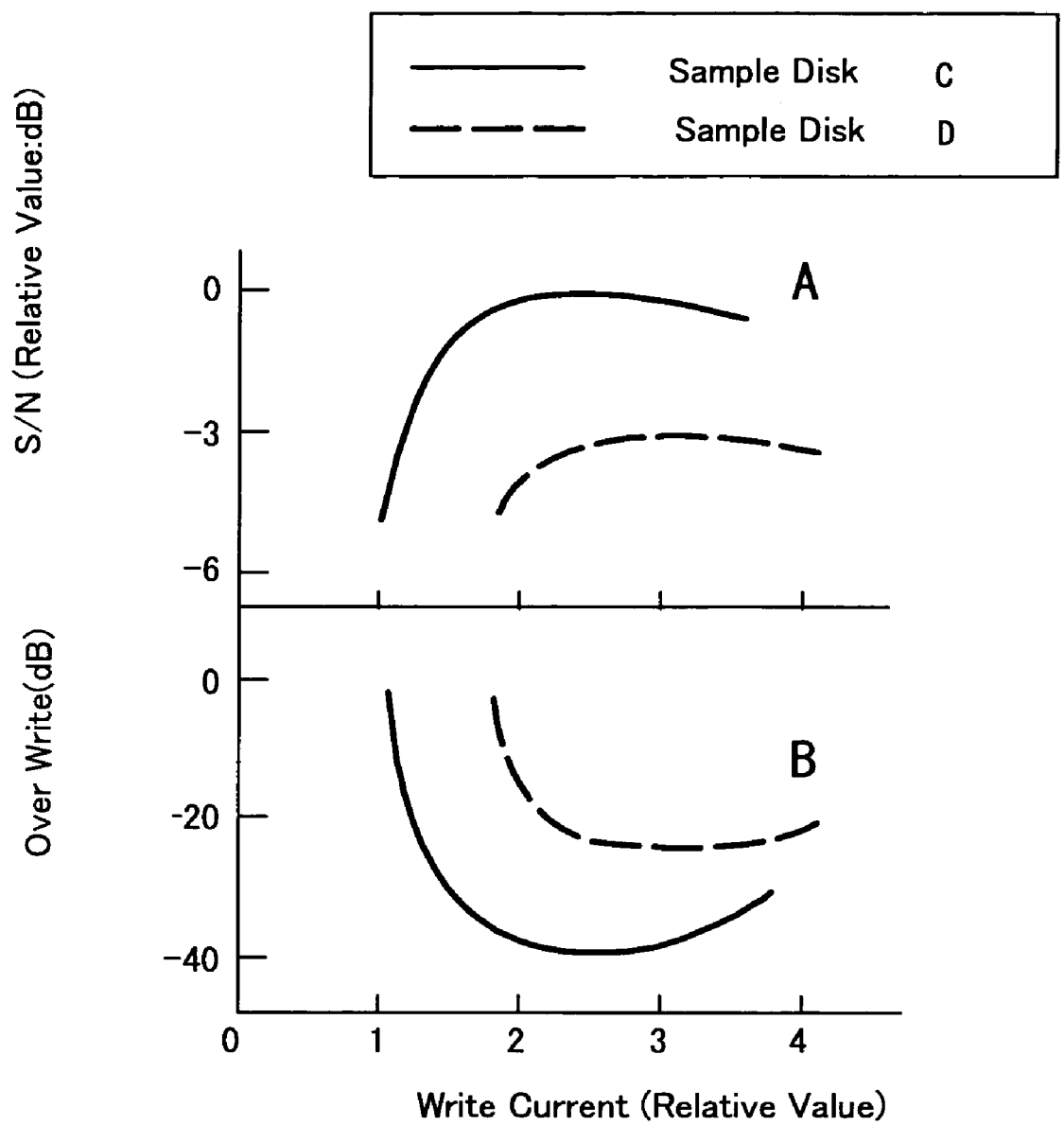
FIG. 22 is a schematic graph that exemplarily shows comparative experimental data of S/N ratios and overwrite properties in magnetic recording media according to the present invention and the prior art.

The results are shown in FIG. 22. The upper half A of FIG. 22 is the graph that shows the relation between writing currents and regeneration signals S/N at 400 kBPI corresponding to 60 nm pitch. The lower half B of FIG. 22 shows overwrite properties after writing a signal of 200 kBPI i.e. after writing with larger bit at overwriting a signal of 400 kBPI i.e. writing with lower bit, and erasing residue of a signal of 200 kBPI i.e. erasing residue of larger bit.

The results of FIG. 22 demonstrate that sample disk C was superior to sample disk D in terms of S/N as well as overwrite properties.

What is claimed is:

1. A method for producing a stamper, comprising:
   forming a convexoconcave line on a support,
   arranging fine particles on the support to form a pattern, and
   transferring the pattern to a stamper material,
   wherein the pattern is formed from aligned fine particles, and the fine particles are aligned into monolayer along the convexoconcave line, wherein the width of the concave portion and the width of the convex portion are expressed by $(2n+1)r$, and the height of the convex portion is shorter than $2r$ (r: radius of fine particles, n: an integer of 1 or more in terms of the width of the concave portion, n: an integer of 0 or more in terms of the width of the convex portion).

2. The method for producing a stamper according to claim 1, wherein the fine particles are aligned into the pattern by one of pull-up methods and centrifugal methods.

3. The method for producing a stamper according to claim 1, wherein the pattern of fine particles is hexagonal closest packing.

4. The method for producing a stamper according to claim 1, wherein the stamper material is Ni.

5. The method for producing a stamper according to claim 1, wherein a metal is vapor-deposited onto the surface of the stamper material to which the pattern of aligned fine particles is transferred, after the pattern of aligned fine particles is transferred.

* * * * *

UNITED STATES PATENT AND TRADEMARK OFFICE
CERTIFICATE OF CORRECTION

| | | |
|---|---|---|
| PATENT NO. | : 7,629,021 B2 | Page 1 of 1 |
| APPLICATION NO. | : 11/258355 | |
| DATED | : December 8, 2009 | |
| INVENTOR(S) | : Hiroshi Nakao | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1009 days.

Signed and Sealed this
Third Day of May, 2011

David J. Kappos
*Director of the United States Patent and Trademark Office*